(12) United States Patent
Oh

(10) Patent No.: US 11,782,840 B2
(45) Date of Patent: Oct. 10, 2023

(54) MEMORY SYSTEM, OPERATION METHOD THEREOF, AND DATABASE SYSTEM INCLUDING THE MEMORY SYSTEM

(71) Applicant: SK hynix Inc., Gyeonggi-do (KR)

(72) Inventor: Yong-Seok Oh, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 45 days.

(21) Appl. No.: 17/518,355

(22) Filed: Nov. 3, 2021

(65) Prior Publication Data
US 2022/0058130 A1 Feb. 24, 2022

Related U.S. Application Data

(62) Division of application No. 16/422,125, filed on May 24, 2019, now Pat. No. 11,182,300.

(30) Foreign Application Priority Data

Oct. 1, 2018 (KR) .................. 10-2018-0116993

(51) Int. Cl.
*G06F 12/0882* (2016.01)
*G06F 9/46* (2006.01)
*G06F 12/0815* (2016.01)
*G06F 12/0873* (2016.01)

(52) U.S. Cl.
CPC ........ *G06F 12/0882* (2013.01); *G06F 9/467* (2013.01); *G06F 12/0815* (2013.01); *G06F 12/0873* (2013.01)

(58) Field of Classification Search
CPC ............ G06F 12/0882; G06F 12/0815; G06F 12/0873; G06F 9/467
See application file for complete search history.

(56) References Cited

U.S. PATENT DOCUMENTS

| 6,668,304 B1 | 12/2003 | Satran et al. |
| 9,047,334 B1 * | 6/2015 | Cheriton ............ G06F 16/2365 |
| 9,842,031 B1 * | 12/2017 | Kharatishvili .......... G06F 16/27 |

(Continued)

FOREIGN PATENT DOCUMENTS

| CN | 1365056 A | 8/2002 |
| CN | 103377130 A | 10/2013 |

(Continued)

OTHER PUBLICATIONS

Ravi Rajwar et al., Virtualizing Transactional Memory, Proceedings of the 32nd International Symposium on Computer Architecture (ISCA 2005), May 2005, IEEE.

(Continued)

*Primary Examiner* — Prasith Thammavong
(74) *Attorney, Agent, or Firm* — IP & T GROUP LLP

(57) ABSTRACT

A method for operating a multi-transaction memory system, the method includes: storing Logical Block Address (LBA) information changed in response to a request from a host and a transaction identification (ID) of the request into one page of a memory block; and performing a transaction commit in response to a transaction commit request including the transaction ID from the host, wherein the performing of the transaction commit includes: changing a valid block bitmap in a controller of the multi-transaction memory system based on the LBA information.

11 Claims, 18 Drawing Sheets

(56) References Cited

U.S. PATENT DOCUMENTS

| | | | |
|---|---|---|---|
| 2008/0244205 A1 | 10/2008 | Amano et al. | |
| 2014/0195725 A1 | 7/2014 | Bennett | |
| 2016/0077744 A1* | 3/2016 | Pundir | G06F 3/0608 |
| | | | 711/103 |
| 2016/0139838 A1* | 5/2016 | D'Sa | H04L 67/1097 |
| | | | 711/114 |
| 2017/0199685 A1* | 7/2017 | Kim | G06F 3/0659 |

FOREIGN PATENT DOCUMENTS

| | | |
|---|---|---|
| CN | 105808444 A | 7/2016 |
| CN | 107168640 A | 9/2017 |
| CN | 108572927 A | 9/2018 |

OTHER PUBLICATIONS

Certificate of Invention Patent for the Chinese Patent Application No. 110968522 B issued by the Chinese Patent Office dated Apr. 7, 2023.

\* cited by examiner

MEMORY SYSTEM, OPERATION METHOD THEREOF, AND DATABASE SYSTEM INCLUDING THE MEMORY SYSTEM

CROSS-REFERENCE TO RELATED APPLICATION

This application is a division of U.S. patent application Ser. No. 16/422,125 filed on May 24, 2019, which claims benefits of priority of Korean Patent Application No. 10-2018-0116993 filed on Oct. 1, 2018. The disclosure of each of the foregoing application is incorporated herein by reference in its entirety.

BACKGROUND

1. Field

Various embodiments of the present invention relate to a memory system, and more particularly, to a multi-transaction memory system and a method for operating the multi-transaction memory system.

2. Description of the Related Art

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since they have no moving parts, memory systems provide advantages such as excellent stability and durability, high information access speed, and low power consumption. Examples of memory systems having such advantages include universal serial bus (USB) memory devices, memory cards having various interfaces, and solid state drives (SSD).

SUMMARY

Embodiments of the present invention are directed to a memory system capable of securing atomicity of file system metadata in a multi-transaction memory system, and a method for operating the memory system.

In accordance with an embodiment of the present invention, a method for operating a multi-transaction memory system, the method includes: storing Logical Block Address (LBA) information changed in response to a request from a host and a transaction identification (ID) of the request in one page of a memory block; and performing a transaction commit in response to a transaction commit request including the transaction ID from the host, wherein the performing of the transaction commit includes: changing a valid block bitmap in a controller of the multi-transaction memory system based on the LBA information.

In accordance with another embodiment of the present invention, a method for operating a multi-transaction memory system, the method includes: storing an inode changed in response to a request from a host and a transaction identification (ID) of the request into one page of a memory block; and performing a transaction commit in response to a transaction commit request including the transaction ID from the host, wherein the performing of the transaction commit includes: reading data in an existing inode page; generating new inode page with data by updating the data in existing inode page based on the changed inode; storing the new inode page data in the memory block; and updating the mapping information of the new inode page data.

In accordance with another embodiment of the present invention, a multi-transaction memory system includes: a memory device suitable for storing Logical Block Address (LBA) information changed in response to a request from a host and a transaction identification (ID) of the request in one page; a valid block bitmap including LBA information for a plurality of LBAs; and a controller suitable for committing a transaction by changing the valid block bitmap based on the changed LBA information in response to a transaction commit request including the transaction ID from the host.

In accordance with another embodiment of the present invention, a multi-transaction memory system includes: a memory block suitable for storing an inode changed in response to a request from a host and a transaction identification (ID) of the request in one page of the memory block; and a controller suitable for committing a transaction commit in response to a transaction commit request including the transaction ID from the host, by reading data in an existing inode page, generating a new inode page with data by updating the data in the existing inode page based on the changed inode, storing the new inode page data in the memory block, and updating mapping information of the new inode page data.

In accordance with another embodiment of the present invention, a multi-transaction memory system includes: a host including an application layer and an operating system; and a multi-transaction memory system including a valid block bitmap, wherein the operating system includes a block bitmap, changes an LBA in response to a request from the application layer, stores the changed LBA information and a transaction ID of the request in one page of a memory block of the memory system, wherein the memory system commits a transaction by changing the valid block bitmap based on the changed LBA information in response to a transaction commit request including the transaction ID from the operating system, and wherein the operating system receives the valid block bitmap from the memory system and builds a file system block bitmap.

In accordance with another embodiment of the present invention, a multi-transaction memory system includes: a host including an application layer and an operating system; and a multi-transaction memory system, wherein the operating system changes an inode in response to a request from the application layer, and stores the changed inode and a transaction ID of the request in one page of a memory block of the memory system, wherein the memory system commits a transaction by reading data in an existing inode page in response to a transaction commit request including the transaction ID from the operating system, generating a new inode page with data by updating the data in the existing inode page based on the changed inode, storing the new inode page data in the memory block, and updating mapping information of the new inode page data, and wherein the operating system receives the updated mapping information from the memory system and builds an inode table.

In accordance with another embodiment of the present invention, a method for operating a multi-transaction memory system, the method includes: storing, in response to transaction log requests, user data, information on a changed file of a file system within a host, and information on allocation of a logical block address in a memory block within the memory system; updating, in response to a transaction commit request, map data of the user data stored in the memory block; updating, in response to the transaction commit request, existing information on files of the file system based on the information on a changed file; storing the updated information on files in the memory block; updating the map data of the updated information on files stored in the memory block; generating therein, in response to the transaction commit request, a block bitmap indicating whether the logical block address is assigned or not; providing the host with one or more between the block bitmap and a logical block address of the information on the files in response to a request from the host thereby recovering the block bitmap and the information of the files within the host.

DETAILED DESCRIPTION

Figure 1:
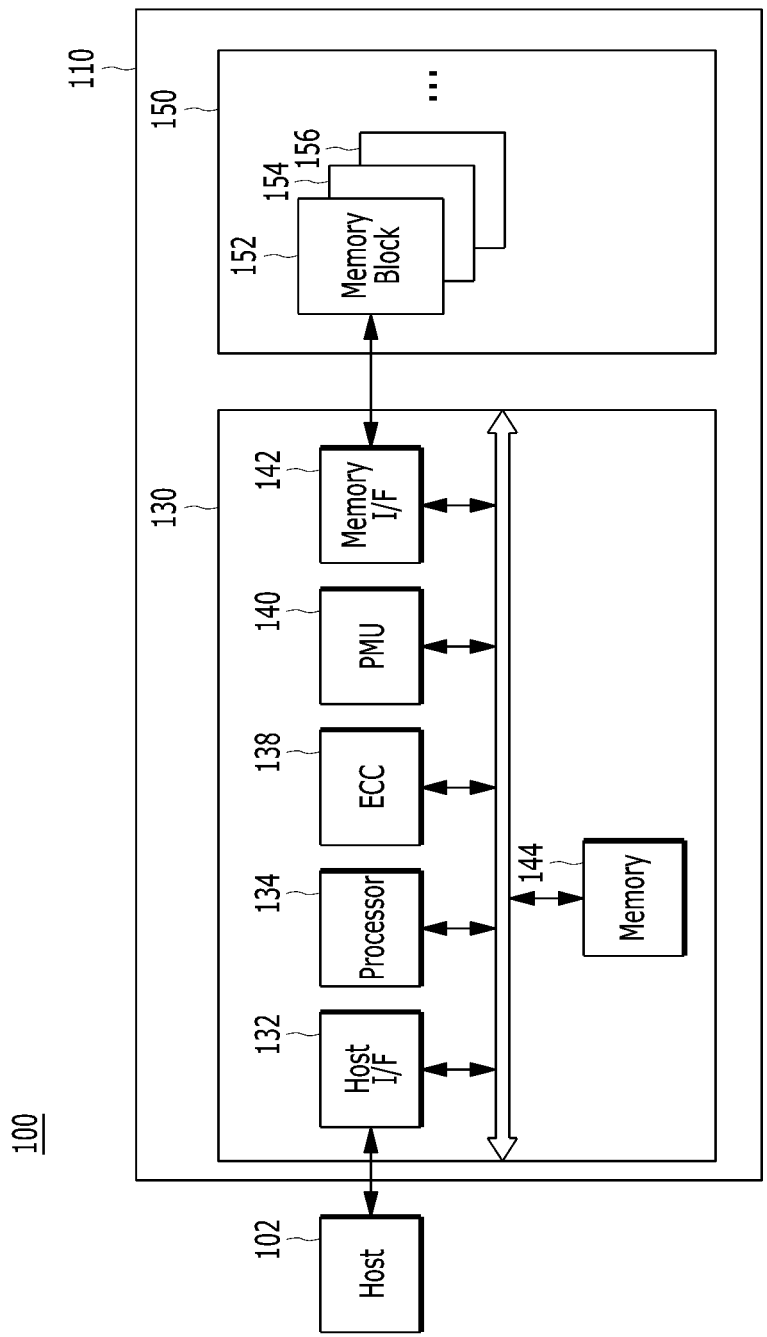
FIG. 1 is a block diagram illustrating a data processing system including a memory system in accordance with an embodiment of the present invention.

Various embodiments of the present invention will be described below in more detail with reference to the accompanying drawings. The present invention may, however, be embodied in different forms and should not be construed as limited to the embodiments set forth herein. Rather, these embodiments are provided so that this disclosure is thorough and complete and fully conveys the scope of the present invention to those skilled in the art. Throughout the disclosure, like reference numerals refer to like parts throughout the various figures and embodiments of the present invention.

It is noted that reference to "an embodiment," "another embodiment" or the like does not necessarily mean only one embodiment, and different references to any such phrase are not necessarily to the same embodiment(s).

It will be understood that, although the terms "first" and/or "second" may be used herein to identify various elements, these elements should not be limited by these terms. These terms are only used to distinguish one element from another element that otherwise have the same or similar names. For instance, a first element discussed below could be termed a second element and vice versa without departing from the teachings of the present disclosure.

It will be understood that when an element is referred to as being "coupled" or "connected" to another element, it can be directly coupled or connected to the other element or one or more intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to" or "directly adjacent to" should be construed in the same way.

The terminology used herein is for the purpose of describing particular embodiments and is not intended to be limiting. In the present disclosure, the singular forms are intended to include the plural forms as well, unless the context clearly indicates otherwise. It will be further understood that open-ended terms, such as "comprise", "include", and "have", when used in this specification, specify the presence of stated features, numbers, steps, operations, elements, components, and/or combinations of them but do not preclude the presence or addition of one or more other features, numbers, steps, operations, elements, components, and/or combinations thereof.

The embodiments described herein are for the purpose of understanding the present invention, not to limit it. As those skilled in the art to which the present disclosure pertains will understand from the disclosure, various modifications within the technical spirit and scope of the present invention may be made to the embodiments described herein.

Unless otherwise defined, all terms including technical and scientific terms used herein have the same meaning as commonly understood by one of ordinary skill in the art to which the present disclosure pertains. Unless otherwise defined in the present disclosure, the terms should not be construed as being ideal or excessively formal.

Various embodiments of the present invention will be described in detail with reference to the attached drawings.

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may include any of various portable electronic devices such as a mobile phone, MP3 player and laptop computer, or any of various non-portable electronic devices such as a desktop computer, a game machine, a television (TV), and a projector.

The host 102 may include at least one operating system (OS), which may manage and control overall functions and operations of the host 102, and provide operation between the host 102 and a user using the data processing system 100 or the memory system 110. The OS may support functions and operations corresponding to the use purpose and usage of a user. For example, the OS may be divided into a general OS and a mobile OS, depending on the mobility of the host 102. The general OS may be divided into a personal OS and an enterprise OS, depending on the environment of a user. For example, the personal OS configured to support a function of providing a service to general users may include Windows and Chrome, and the enterprise OS configured to secure and support high performance may include Windows server, Linux and Unix. Furthermore, the mobile OS configured to support a function of providing a mobile service to users and a power saving function of a system may include Android, iOS and Windows Mobile. The host 102 may include a plurality of OSs, and execute an OS to perform an operation corresponding to a user's request on the memory system 110.

The memory system 110 may operate to store data for the host 102 in response to a request of the host 102. Non-limiting examples of the memory system 110 include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and/or micro-MMC. The SD card may include a mini-SD card and/or micro-SD card.

The memory system 110 may be embodied by various types of storage devices. Examples of such storage devices include, but are not limited to, volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM) and a flash memory. The flash memory may have a 3-dimensional (3D) stack structure.

The memory system 110 may include a controller 130 and a memory device 150. The memory device 150 may store data for the host 102, and the controller 130 may control data storage into the memory device 150.

The controller 130 and the memory device 150 may be integrated into a single semiconductor device, which may be included in any of the various types of memory systems as exemplified above. For example, the controller 130 and the memory device 150 may be integrated as one semiconductor device to constitute a solid state drive (SSD). When the memory system 110 is used as an SSD, the operating speed of the host 102 connected to the memory system 110 can be improved. In addition, the controller 130 and the memory device 150 may be integrated as one semiconductor device to constitute a memory card, such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD, micro-SD and SDHC, or universal flash storage (UFS) device.

Non-limiting application examples of the memory system 110 include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory blocks 152, 154, 156 . . . , each of which may include a plurality of pages, and each of the pages may include a plurality of memory cells coupled to a word line. In an embodiment, the memory device 150 may be a flash memory. The flash memory may have a 3-dimensional (3D) stack structure.

Since the structure of the memory device 150 including its 3D stack structure will be described in detail later with reference to FIGS. 2 to 4, further description of this aspect is omitted here.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

The controller 130 may include a host interface (I/F) 132, a processor 134, an error correction code (ECC) component 138, a Power Management Unit (PMU) 140, a memory I/F 142 such as a NAND flash controller (NFC), and a memory 144 all operatively coupled via an internal bus.

The host interface 132 may be configured to process a command and data of the host 102, and may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and integrated drive electronics (IDE).

The ECC component 138 may detect and correct an error contained in the data read from the memory device 150. In other words, the ECC component 138 may perform an error correction decoding process to the data read from the memory device 150 through an ECC code used during an ECC encoding process. According to a result of the error correction decoding process, the ECC component 138 may output a signal, for example, an error correction success/fail signal. When the number of error bits is more than a threshold value of correctable error bits, the ECC component 138 may not correct the error bits, and may instead output an error correction fail signal.

The ECC component 138 may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC component 138 is not limited to any specific correction technique or structure. Thus, the ECC component 138 may include any and all circuits, modules, systems or devices suitable for error correction.

The PMU 140 may provide and manage power of the controller 130.

The memory I/F 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the memory I/F 142 may generate a control signal for the memory device 150 and process data to be provided to the memory device 150 under the control of the processor 134. The memory I/F 142 may work as an interface (e.g., a NAND flash interface) for processing a command and data between the controller 130 and the memory device 150. Specifically, the memory I/F 142 may support data transfer between the controller 130 and the memory device 150.

The memory 144 may serve as a working memory of the memory system 110 and the controller 130, and store data for driving the memory system 110 and the controller 130. The controller 130 may control the memory device 150 to perform read, write, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or externally to the controller 130. FIG. 1 exemplifies the memory 144 disposed within the controller 130. In an embodiment, the memory 144 may be embodied by an external volatile memory having a memory interface transferring data between the memory 144 and the controller 130.

The processor 134 may control the overall operations of the memory system 110. The processor 134 may drive firmware to control the overall operations of the memory system 110. The firmware may be referred to as flash translation layer (FTL). Also, the processor 134 may be realized as a microprocessor and/or a central processing unit (CPU).

For example, the controller 130 may perform an operation requested by the host 102 in the memory device 150 through the processor 134. In other words, the controller 130 may perform a command operation corresponding to a command received from the host 102, or other source. The controller 130 may perform a foreground operation as the command operation corresponding to the command received from the host 102. For example, the controller 130 may perform a program operation corresponding to a write command, a read operation corresponding to a read command, an erase operation corresponding to an erase command, and a parameter set operation corresponding to a set parameter command or a set feature command.

Also, the controller 130 may perform a background operation onto the memory device 150 through the processor 134. The background operation performed onto the memory device 150 may include an operation of copying and processing data stored in some memory blocks among the memory blocks 152 to 156 of the memory device 150 into other memory blocks, e.g., a garbage collection (GC) operation, an operation of swapping data between select blocks of the memory blocks 152 to 156, e.g., a wear-leveling (WL) operation, an operation of storing the map data stored in the controller 130 in the memory blocks 152 to 156, e.g., a map flush operation, or an operation of managing bad blocks of the memory device 150, e.g., a bad block management operation of detecting and processing bad blocks among the memory blocks 152 to 156.

A memory device of the memory system in accordance with an embodiment of the present invention is described in detail with reference to FIGS. 2 to 4.

Figure 2:
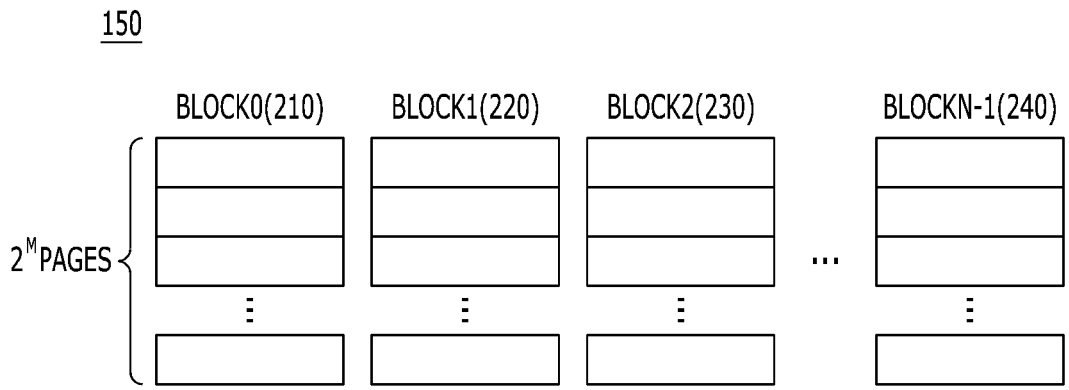
FIG. 2 is a schematic diagram illustrating an exemplary configuration of a memory device employed in the memory system of FIG. 1.
Figure 3:
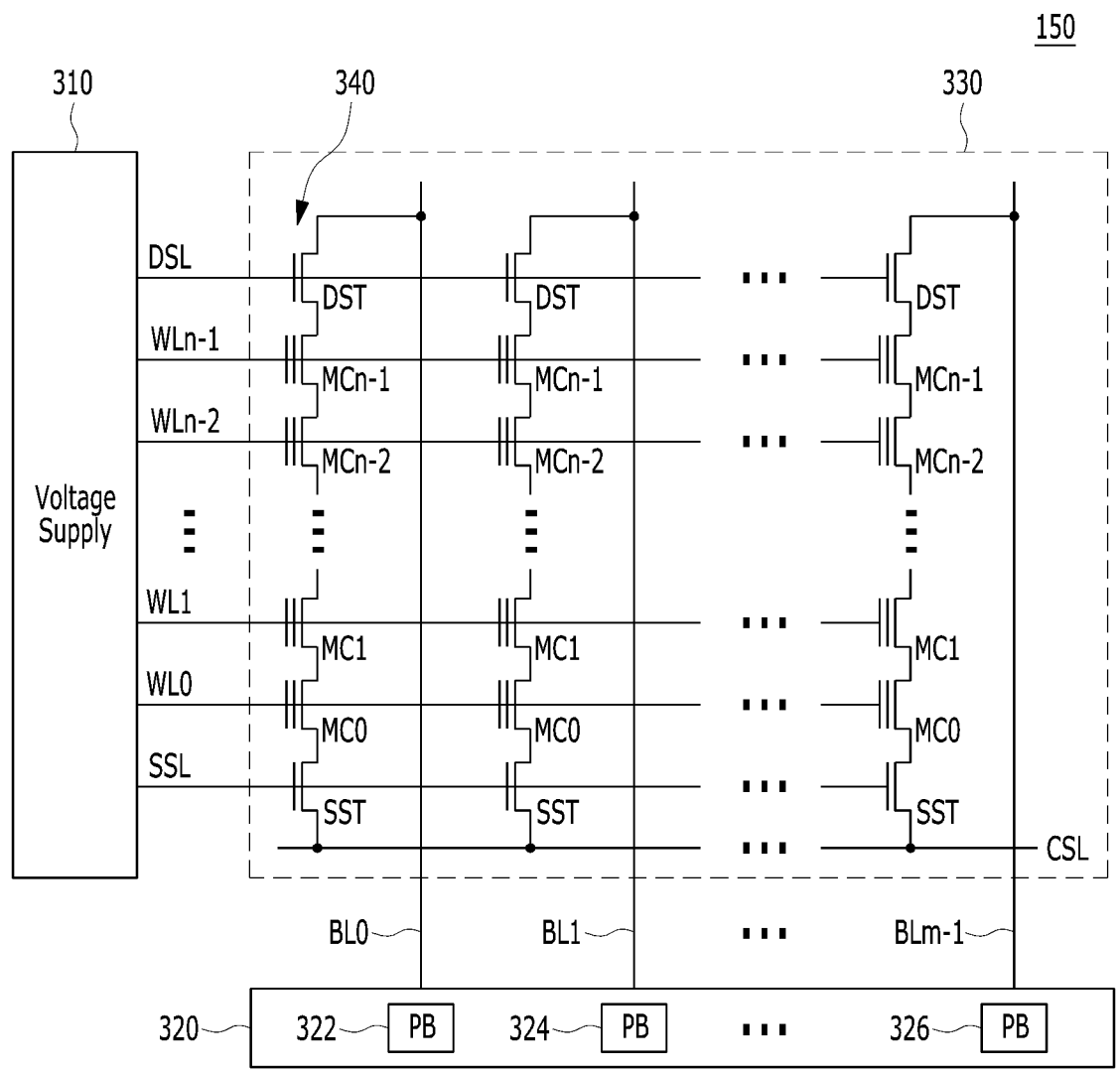
FIG. 3 is a circuit diagram illustrating an exemplary configuration of a memory cell array of a memory block in the memory device shown in FIG. 1.
Figure 4:
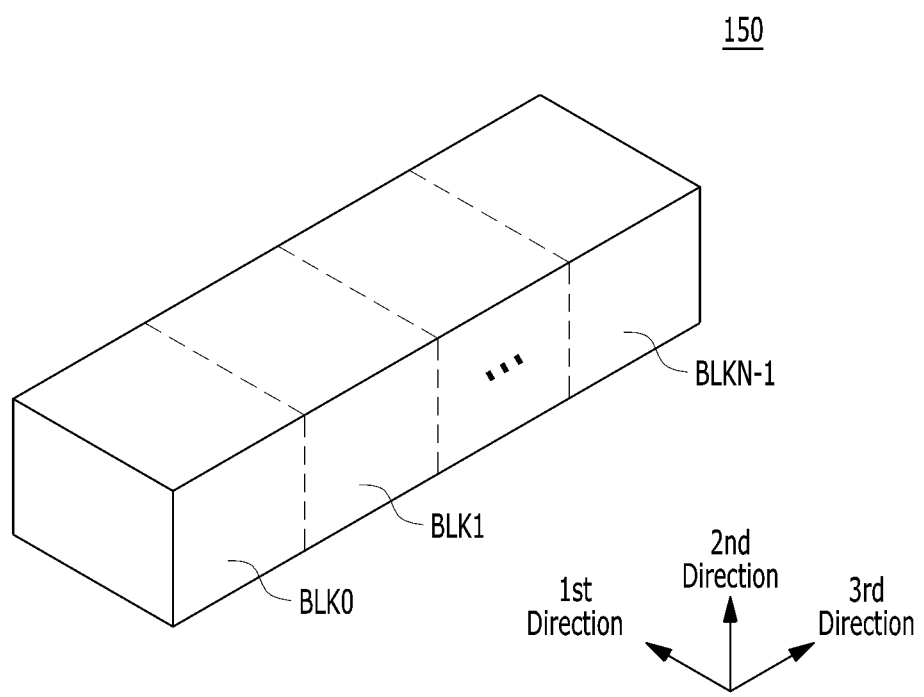
FIG. 4 is a block diagram illustrating an exemplary three-dimensional structure of the memory device shown in FIG. 2.

FIG. 2 is a schematic diagram illustrating the memory device 150, FIG. 3 is a circuit diagram illustrating an exemplary configuration of a memory cell array of a memory block in the memory device 150, and FIG. 4 is a schematic diagram illustrating an exemplary 3D structure of the memory device 150.

Referring to FIG. 2, the memory device 150 may include a plurality of memory blocks, e.g., BLOCK0 (210), BLOCK1 (220), BLOCK2 (230), and to BLOCKN−1 (240). Each of the memory blocks 210, 220, 230 and 240 may include a plurality of pages, for example $2^M$ pages, the number of which may vary according to circuit design. For example in some applications, each of the memory blocks may include M pages. Each of the pages may include a plurality of memory cells that are coupled to a plurality of word lines WL.

Also, the memory device 150 may include a plurality of memory blocks, which may include a single level cell (SLC) memory block and/or a multi-level cell (MLC) memory block. The SLC memory blocks may include a plurality of pages that are realized by memory cells each storing one-bit data in one memory cell. The SLC memory blocks may have a quick data operation performance and high durability. On the other hand, the MLC memory blocks may include a plurality of pages that are realized by memory cells each storing multi-bit data, e.g., data of two or more bits, in one memory cell. The MLC memory blocks may have a greater data storing space than the SLC memory blocks. In other words, the MLC memory blocks may be highly integrated. Particularly, the memory device 150 may include higher-storage-capacity MLC memory blocks, including triple level cell (TLC) memory blocks each of which includes a plurality of pages that are realized by memory cells each capable of storing three-bit data in one memory cell, quadruple level cell (QLC) memory blocks each of which includes a plurality of pages that are realized by memory cells each capable of storing four-bit data in one memory cell, and/or still-higher multiple level cell memory blocks each of which includes a plurality of pages that are realized by memory cells each capable of storing five or more-bit data in one memory cell.

In accordance with an embodiment of the present invention, the memory device 150 is described as a non-volatile memory, such as a flash memory, e.g., a NAND flash memory. However, the memory device 150 may be realized as any of a Phase Change Random Access Memory (PCRAM), a Resistive Random Access Memory (RRAM or ReRAM), a Ferroelectric Random Access Memory (FRAM), a Spin Transfer Torque Magnetic Random Access Memory (STT-RAM or STT-M RAM).

The memory blocks 210, 220, 230 and 240 may store the data transferred from the host 102 through a program operation, and transfer data stored therein to the host 102 through a read operation.

Referring to FIG. 3, a memory block 330, which may correspond to any of the plurality of memory blocks 152 to 156 included in the memory device 150 of the memory system 110, may include a plurality of cell strings 340 coupled to a plurality of corresponding bit lines BL0 to BLm−1. The cell string 340 of each column may include one or more drain select transistors DST and one or more source select transistors SST. Between the drain and source select transistors DST and SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1. For reference, in FIG. 3, 'DSL' denotes a drain select line, 'SSL' denotes a source select line, and 'CSL' denotes a common source line.

Although FIG. 3 illustrates NAND flash memory cells, the invention is not limited in this way. It is noted that the memory cells may be NOR flash memory cells, or hybrid flash memory cells including two or more types of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply 310 which provides word line voltages including a program voltage, a read voltage and a pass voltage to supply to the word lines according to an operation mode. The voltage generation operation of the voltage supply 310 may be controlled by a control circuit (not illustrated). Under the control of the control circuit, the voltage supply 310 may select one of the memory blocks (or sectors) of the memory cell array, select one of the word lines of the selected memory block, and provide the word line voltages to the selected word line and the unselected word lines as may be needed.

The memory device 150 may include a read and write (read/write) circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

The memory device 150 may be embodied by a two-dimensional (2D) or three-dimensional (3D) memory device. Particularly, as illustrated in FIG. 4, the memory device 150 may be embodied by a nonvolatile memory device having a 3D stack structure. When the memory device 150 has a 3D structure, the memory device 150 may include a plurality of memory blocks BLOCK0 to BLOCKN−1. FIG. 4 is a block diagram illustrating the memory blocks 152 to 156 of the memory device 150 shown in FIG. 1. Each of the memory blocks 152 to 156 may be realized in a 3D structure (or vertical structure). For example, the memory blocks 152 to 156 may be a three-dimensional structure with dimensions extending in first to third directions, e.g., an x-axis direction, a y-axis direction, and a z-axis direction.

Each memory block 330 included in the memory device 150 may include a plurality of NAND strings NS that are extended in the second direction, and a plurality of NAND strings NS (not shown) that are extended in the first direction and the third direction. Each of the NAND strings NS may be coupled to a bit line BL, at least one string selection line SSL, at least one ground selection line GSL, a plurality of word lines WL, at least one dummy word line DWL (not shown), and a common source line CSL, and each of the NAND strings NS may include a plurality of transistor structures TS (not shown).

In short, each memory block 330 among the memory blocks 152 to 156 of the memory device 150 may be coupled to a plurality of bit lines BL, a plurality of string selection lines SSL, a plurality of ground selection lines GSL, a plurality of word lines WL, a plurality of dummy word lines DWL, and a plurality of common source lines CSL, and each memory block 330 may include a plurality of NAND strings NS. Also, in each memory block 330, one bit line BL may be coupled to a plurality of NAND strings NS to realize a plurality of transistors in one NAND string NS. Also, a string selection transistor SST of each NAND string NS may be coupled to a corresponding bit line BL, and a ground selection transistor GST of each NAND string NS may be coupled to a common source line CSL. Memory cells MC may be provided between the string selection transistor SST and the ground selection transistor GST of each NAND string NS. In other words, a plurality of memory cells may be realized in each memory block 330 of the memory blocks 152 to 156 of the memory device 150.

Figure 5A:
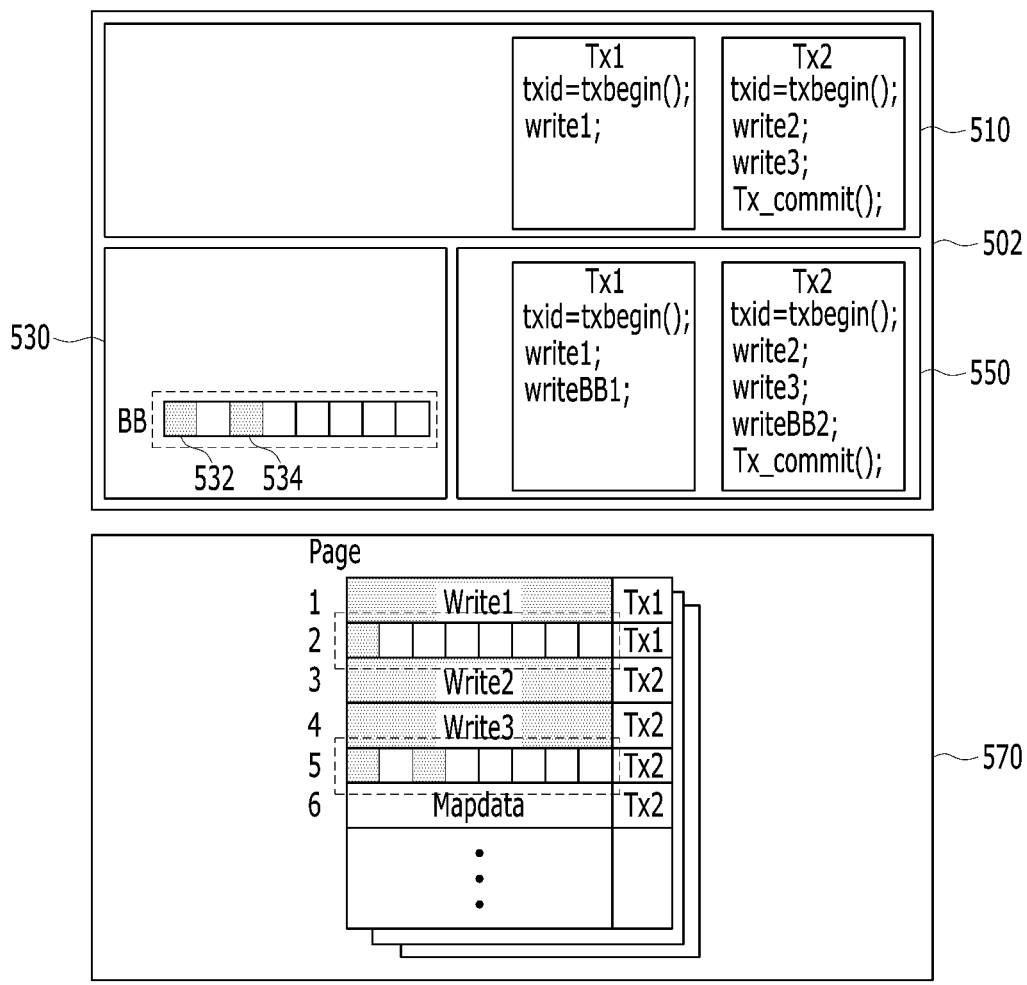
FIGS. 5A and 5B are block diagrams schematically illustrating a structure of a host and a conventional multi-transaction memory system.
Figure 5B:
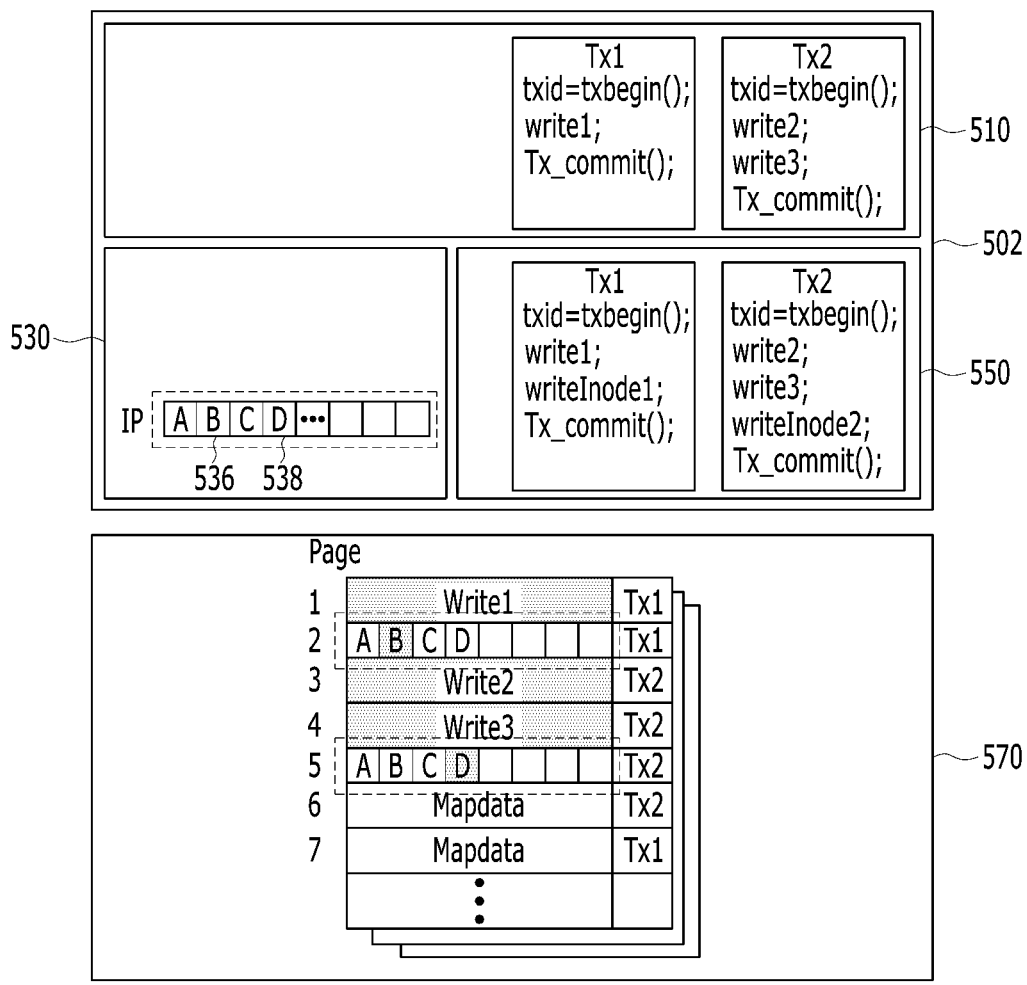

FIGS. 5A and 5B are block diagrams schematically illustrating a structure of a host 502 and a multi-transaction memory system 570 according to prior art.

A transaction may be a unit of operation performed in a database system. A plurality of requests included in one transaction all have to be successfully processed, i.e., committed, together or aborted together. If any process among the processes for the requests fails, all the requests included in the corresponding transaction have to be aborted. This is called the atomicity of the transaction.

A multi-transaction system may perform a plurality of transactions simultaneously. Each of the transactions may have to be performed independently.

According to the prior art, prior to the introduction of the multi-transaction memory system, a multi-transaction system was realized by applying a journaling technique to the file system of the host. To be specific, the host logs a change corresponding to a transaction request for each of the transactions into a journal, and when the transaction is committed, the host reflects the logged matter into the memory system. When a power failure occurs and the transaction system is interrupted, the host performs a reboot and then secures the atomicity of the transaction by tracking the logged change and aborting an uncommitted change.

However, when the above journaling technique is used, there is a problem in that the processing burden of the host increases. Therefore, as shown in FIGS. 5A and 5B, a multi-transaction memory system 570 that supports transactions in a memory system is introduced.

Referring to FIG. 5A, the host 502 may include an application layer 510, a memory 530, and an operating system 550.

The application layer 510 may refer to a layer in which an application program runs. The operating system 550 may be for managing computer resources, and it may include a file system for managing files generated in the application layer 510. The memory 530 may store file system metadata, which are metadata that the file system uses to manage the files generated in the application layer 510. FIG. 5A illustrates a block bitmap BB as the file system metadata representing whether each of logical block addresses used by the file system is allocated for storing data or not.

FIG. 5A illustrates a case where plural transactions (e.g., first and second transactions Tx1 and Tx2) are performed at the same time. The operating system 550 may manage transactions performed in the application layer 510. In particular, the operating system 550 may provide the memory system 570 with the requests generated in the application layer 510 as a transaction request.

The transaction request may include a transaction start request, a transaction log request, a transaction commit request, and a transaction abort request.

To be specific, when a new transaction is to be performed, the application layer 510 may provide the operating system 550 with a transaction start request, and the operating system 550 may provide the memory system 570 with the transaction start request. The memory system 570 may assign a transaction identification (ID) to the new transaction in response to the transaction start request. FIG. 5A illustrates that transaction IDs Tx1 and Tx2 are assigned to two transaction start requests, respectively. In this specification, a transaction corresponding to transaction ID Tx1 may be referred to as a first transaction. Also, a transaction corresponding to transaction ID Tx2 may be referred to as a second transaction.

The application layer 510 may generate a transaction log request for each of the transactions. The operating system 550 may provide the memory system 570 with the transaction log request. The memory system 570 may write a user data corresponding to the transaction log request into a memory block along with the corresponding transaction ID. The memory system 570 may not update the mapping information of the written user data until receiving the transaction commit request corresponding the transaction ID. The mapping information includes information indicating a relationship between the logical address of the host 502 and the physical address of the memory system 570.

Referring to FIG. 5A, the application layer 510 generates a first write request write1 as a transaction log request for the first transaction Tx1, and the operating system 550 provides the memory system 570 with the first write request write1. FIG. 5A illustrates a state in which the memory system 570 writes a user data Write1 and the transaction ID Tx1 corresponding to the first write request into a page Page 1 of the memory block.

When the user data Write1 is written into the memory block, the file system metadata is changed. The operating system 550 provides the memory system 570 with a file system metadata write request as a transaction log request that causes the changed file system metadata to be written into the memory block. The memory system 570 writes the changed file system metadata into a memory block in response to the file system metadata write request.

Referring to FIG. 5A, in order to write the user data Write1 corresponding to the first write request write1, the operating system 550 assigns a new logical block address and thus part of a block bitmap BB is changed as a result. FIG. 5A illustrates a bit 532 representing that the new logical block address is assigned in response to the first write request write 1 in the block bitmap BB.

Since the memory system 570 performs a write operation on a page-by-page basis, the operating system 550 provides the memory system 570 with a write request writeBB1 for all of block bitmap BB of one page size, as the file system metadata write request. FIG. 5A illustrates that the memory system 570 writes all the block bitmap BB and the transaction ID Tx1 into a page Page 2 in response to the write request writeBB1. In particular, the shaded portion within the block bitmap BB stored in page Page 2 corresponds to the bit 532 within the memory 530.

Similarly, referring to FIG. 5A, second and third write requests write2 and write3 are generated as transaction log requests for the second transaction Tx2, and the operating system 550 provides the memory system 570 with the second and third write requests write2 and write3. The memory system 570 writes the transaction ID Tx2 and data Write2 corresponding to the second write request write2 into page Page 3 of the memory block, and writes the transaction ID Tx2 and data Write3 corresponding to the third write request write3 into page Page 4 of the memory block.

The operating system 550 allocates a new logical block address corresponding to the second and third write requests write2 and write3. FIG. 5A illustrates a bit 534 representing that the new logical block address is assigned in the block bitmap BB.

When the operating system 550 provides the memory system 570 with a write request writeBB2 for all of the block bitmap BB as the file system metadata write request, the memory system 570 writes the transaction ID Tx2 and all of the block bitmap BB into a page Page 5 of the memory block. In particular, the shaded portion within the block bitmap BB stored in the page Page 5 corresponds to the bits 532 and 534 within the memory 530.

The application layer 510 generates a transaction commit request Tx_commit for the second transaction Tx2 in order to reflect the data written in the pages Page 3 to Page 5 of the memory block into the memory system 570 based on the transaction log request for the second transaction Tx2. Reflecting data allows the host 502 to access the data by updating mapping information of the data written to the memory system 570 (e.g., the pages Page 3 to Page 5 of the memory block). The operating system 550 provides the memory system 570 with the transaction commit request Tx_commit. The memory system 570 is able to reflect the data into the memory system 570 by writing mapping information ("Mapdata" in FIG. 5A) of the pages Page 3 to Page 5, where the data are stored, into a page Page 6 of the memory block in response to the transaction commit request Tx_commit. Subsequently, the host 502 accesses the data of the pages Page 3 to Page 5 by referring to the mapping information stored in the page Page 6.

Figure 6:
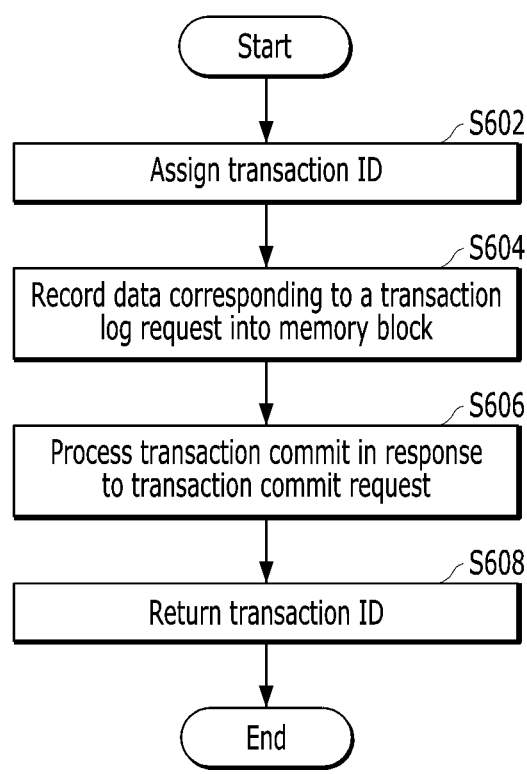
FIG. 6 is a flowchart describing a transaction operation of a conventional multi-transaction memory system.

FIG. 6 is a flowchart describing a transaction operation of the multi-transaction memory system 570 according to prior art.

When the operating system 550 provides the memory system 570 with a transaction start request generated in the application layer 510, the memory system 570 assigns a transaction ID in response to the transaction start request in step S602.

Subsequently, when the operating system 550 provides the memory system 570 with a transaction log request generated in the application layer 510, the memory system 570 writes data corresponding to the transaction log request into a memory block in step S604.

The file system metadata is changed according to the transaction log request, and if the operating system 550 provides the memory system 570 with a write request for the changed file system metadata, the memory system 570 writes the changed file system metadata into the memory block.

When the operating system 550 provides the memory system 570 with a transaction commit request for a transaction corresponding to the assigned transaction ID, the memory system 570 in step S606 reflects data, written to the memory block in response to the transaction, into the memory system 570 by writing mapping information of the data into the memory block in response to the transaction commit request.

When the transaction is committed or completed, the memory system 570 returns the assigned transaction ID corresponding to the transaction and terminates the transaction in step S608.

Further, the application layer 510 provides a transaction abort request for the transaction corresponding to the assigned transaction ID in order not to reflect data corresponding to the transaction log request for the transaction into the memory system 570 but to cancel the transaction log request. When the operating system 550 provides the memory system 570 with the transaction abort request for the particular transaction, the memory system 570 aborts the particular transaction by invalidating all the data written in the memory block in step S604. The host 502 may not access the data, and the data will be deleted from the memory block through a garbage collection operation.

When the memory system 570 is interrupted before the transaction is committed, the uncommitted data stored in the memory block for the transaction log request at step 604 remains in the memory block, and thus the memory system 570 scans the memory block when rebooted and aborts the uncommitted data in order to secure the atomicity of the transaction.

Referring back to FIG. 5A, the block bitmap BB includes information on whether logical block addresses are assigned or not. Accordingly, the block bitmap BB written into the page Page 5 in response to the transaction request for the second transaction Tx2 includes the logical block address assignment information 532 according to the first transaction Tx1 and the logical block address assignment information 534 based on the second transaction Tx2.

Therefore, when the block bitmap BB written into the page Page 5 in response to a transaction commit request for the second transaction Tx2 is reflected into the memory system 570, the logical block address assignment information 532 based on the first transaction Tx1 is also be reflected into the memory system 570 as well.

According to this prior art, since the file system metadata (e.g., the logical block address assignment information 532) according to the first transaction Tx1 is reflected into the memory system 570 by the transaction commit request for the second transaction Tx2 before the transaction commit request for the first transaction Tx1 is made, the memory system 570 may violate the atomicity of the transaction as to the file system metadata.

Referring to FIG. 5B, the memory system 570 may also violate the atomicity of the transaction as to an inode (or i-node), which is also file system metadata.

FIG. 5B illustrates a multi-transaction memory system 570 similar to that described with reference to FIG. 5A. FIG. 5A is a diagram explaining that the memory system 570 may violate the atomicity of a transaction as to the block bitmap BB while FIG. 5B is a diagram explaining that the memory system 570 may violate the atomicity of a transaction as to the inode table.

An inode is a data structure that stores information about each file in the file system of the operating system 550. The inode may be stored in a memory block of the memory system 570. The size of the inode of each file may be smaller than the size of one page and inodes of a plurality of files may be stored into one page of a memory block. The page storing the multiple inodes may be defined as an inode page in this specification.

A table storing inodes for all files may be called an inode table, and the inode table may include a plurality of inode pages. The inode pages may be distributed over several pages of a memory block. The memory 530 of the host 502 may store inode mapping information for accessing each of the inode pages.

When the operating system 550 requires an inode of a certain file B, the operating system 550 loads the inode of the file from the memory system 570 into the memory 530 by referring to the inode mapping information. FIG. 5B illustrates an example where the operating system 550 loads data of an inode page IP containing an inode 536 for the file B from the memory system 570 into the memory 530 by referring to the inode mapping information for the inode 536 for the file B (not illustrated).

When the operating system 550 provides a first write request write1 corresponding to the first transaction, the user data Write1 and the transaction ID Tx1 may be written into the memory block. When the information of the file B is changed due to the first write request write 1 related to file B, which is a transaction log request generated at the application layer 510, the inode 536 for the file B is changed. In this case, the operating system 550 changes the inode 536 for the file B among the inodes loaded from the inode page IP of the memory system 570 into the memory 530.

The operating system 550 provides the memory system 570 with a file system metadata write request (writeInode1) as a transaction log request for writing all inodes of the inode page IP, which are loaded onto the memory 530, to the memory system 570. The memory system 570 writes inodes of the inode page IP and the transaction ID Tx1 into the page Page 2 in response to the file system metadata write request writeInode1. The shade shown in the page Page 2 of FIG. 5B represents a change of the inode 536 for the file B. The change of the inode 536 for the file B is not yet reflected into the memory system 570 because there is no transaction commit request for the first transaction Tx1 at the time of writing the file B into the page Page 2.

The operating system 550 may require an inode 538 for a file D in order to perform the second transaction Tx2, and the inode 538 for the file D may be included in the inodes of the inode page IP including the inode 536 for the file B and loaded into the memory 530.

The operating system 550 reloads the inodes of the inode page IP from the memory system 570 into the memory 530. Meanwhile, since the page Page 2 or the inode page IP storing the change of the inode 536 for the file B is not yet reflected into the memory system 570, the inode 536 for the file B loaded from the page Page 2 into the memory 530 is not yet reflected into the memory system 570.

When the operating system 550 provides a second write request write2 and a third write request write3 corresponding to the second transaction, the user data Write2, Write3 and the transaction ID Tx2 may be written into the memory block. When the information of the file D is changed based on the second and third write requests write2 and write3 related to file D, generated in the application layer 510, the inode 538 for the file D is changed. The operating system 550 changes the inode 538 of the file D among the inodes loaded from the inode page IP of the memory system 570 into the memory 530.

The operating system 550 provides the memory system 570 with a file system metadata write request writeInode2 as a transaction log request for writing all inodes of the inode page IP, which are loaded onto the memory 530, to the memory system 570. The memory system 570 writes inodes of the inode page IP and the transaction ID Tx2 into the page Page 5 in response to the file system metadata write request writeInode2. The shade shown in the page Page 5 of FIG. 5B represents the change of the inode 538 for the file D.

Subsequently, in response to a transaction commit request for the second transaction Tx2 corresponding to the second and third write requests write2 and write3 and file system metadata write request writeInode2, the pages Page 3 to Page 5 are reflected into the memory system 570. The page Page 6 represents the page where the mapping information between the physical addresses of the pages Page 3 to Page 5 and the logical addresses corresponding to the pages Page 3 to Page 5 is recorded. The operating system 550 accesses the latest page Page 5 rather than the existing inode page or Page 2 when an inode is needed.

Subsequently, in response to a transaction commit request for the first transaction Tx1 corresponding to the first write request write 1 and file system metadata write request writeInode1, the pages Page 1 and Page 2 are reflected into the memory system 570. A page Page 7 represents the page where the mapping information between the physical addresses of the pages Page 1 and Page 2 and the logical addresses corresponding to the pages Page 1 and Page 2 is recorded. The operating system 550 accesses the latest page Page 2 rather than the existing page Page 5 when an inode is needed.

Although the page Page 2 includes the change of the inode 536 for the file B, the page Page 2 does not include the change of the inode 538 for the file D. Thus, when the first transaction Tx1 and the second transaction Tx2 are all committed, the inodes stored not in the existing page Page 5 but in the latest page Page 2 are reflected into the memory system 570 and thus the inode change (i.e., the changed inode 538 for the file D) caused by the second transaction Tx2 is not reflected into the memory system 570. As described, the memory system 570 may also violate the atomicity of the transaction as to the inode table.

The multi-transaction memory system 110 in accordance with an embodiment of the present invention may secure the atomicity, even though plural pieces of file system metadata are changed by different transactions within the host 102. Therefore, according to an embodiment of the present invention, when the file system metadata is partially changed, the entire page of the file system metadata including the change is not logged into a memory block; rather, the change only may be logged into a memory block.

In addition, according to an embodiment of the present invention, the memory system 110 may perform an operation of reflecting the change of the file system metadata into a block bitmap and an inode table. Therefore, the block bitmap and the inode table that were managed in the operating system as the file system metadata according to prior art, may be managed in the memory system 110 according to an embodiment of the present invention. Therefore, the burden of the host 102 may be alleviated, which will be described later.

Figure 7:
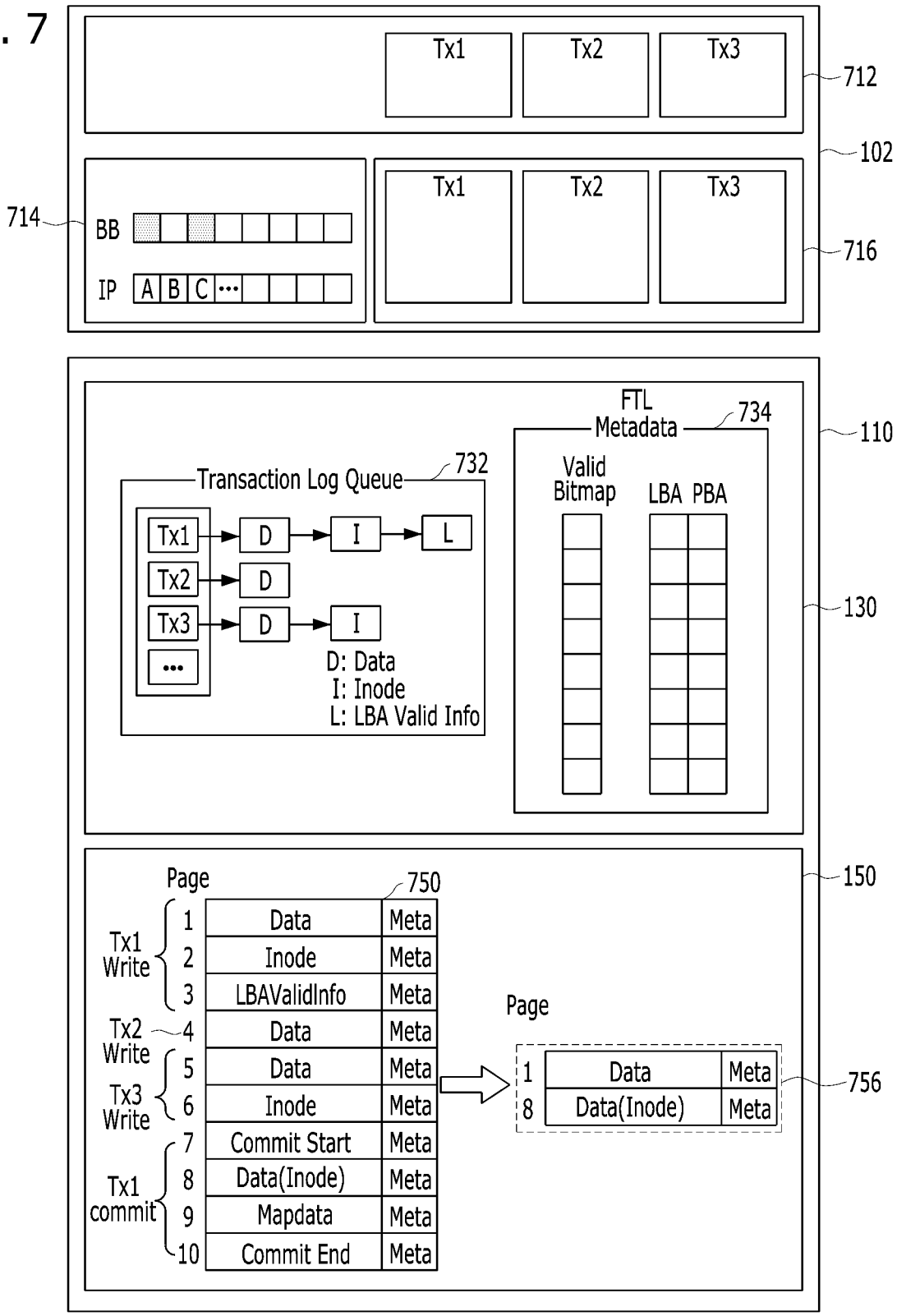
FIG. 7 is a block diagram schematically illustrating a structure of a host and a multi-transaction memory system in accordance with an embodiment of the present invention.

FIG. 7 is a block diagram schematically illustrating a structure of the host 102 and the multi-transaction memory system 110 in accordance with an embodiment of the present invention.

The host 102 may include an application layer 712, a memory 714, and an operating system 716.

FIG. 7 shows an example where three transactions Tx1 to Tx3 are simultaneously performed in the application layer 712.

When a write request is provided as a transaction log request for the first transaction Tx1 from the application layer 712, the operating system 716 may provide the memory system 110 with the write request. FIG. 7 shows an example where the memory system 110 write data corresponding to the write request into a page Page 1 of a memory block 750.

Meanwhile, as the write request is serviced, a Logical Block Address (LBA) may be newly assigned and some bits of a block bitmap BB may be changed, and an inode of a file may be changed.

In accordance with an embodiment of the present invention, the operating system 716 may provide the memory system 110 with a file system metadata change request for logging, not all the block bitmap BB and all the inode page, but only the changed LBA information and the changed inode into the memory block as a transaction log request. FIG. 7 exemplarily illustrates pages Page 2 and Page 3 where only the changed LBA information LBAValidInfo and the changed inode information InodeChangeInfo are written. The changed LBA information LBAValidInfo and the changed inode information InodeChangeInfo will be described in detail with reference to FIG. 8.

Figure 8:
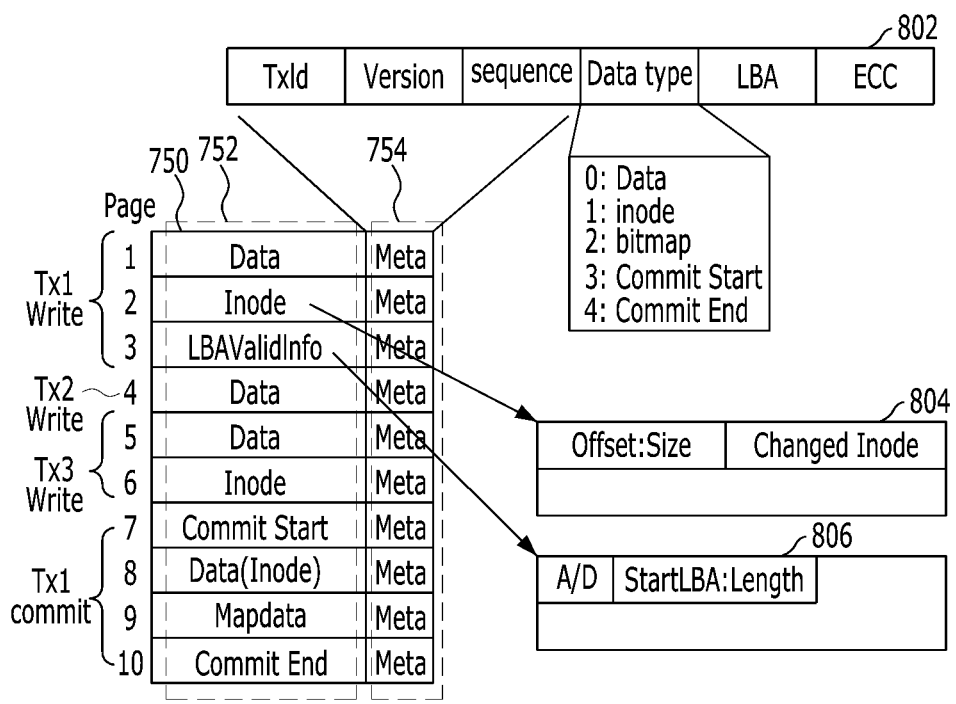
FIG. 8 is a diagram illustrating a memory block in accordance with an embodiment of the present invention.

FIG. 8 illustrates the memory block 750 in accordance with an embodiment of the present invention.

One memory block 750 may include a plurality of pages, each of which may include a data area 752 and a meta area 754.

The data area 752 may store a user data Data, a file system metadata, and a transaction commit log. The file system metadata may include inode change information InodeChangeInfo 804 and block bitmap change information LBAValidInfo 806.

The inode change information 804 may include the changed inode and size information, and offset information of the changed inode in the inode page including the changed inode. When the size of the inode change information 804 is smaller than the size of the data area 752 within a single page, dummy data may be filled in the remaining part of the data area 752.

The block bitmap change information LBAValidInfo 806 may include LBA allocation information A/D and LBA start address StartLBA and length information Length as changed LBA information. To be specific, 'A' of the LBA allocation information A/D may represent that an LBA is allocated. 'D' of the LBA allocation information A/D may represent that the corresponding LBA is deallocated. When the size of the block bitmap change information 806 is smaller than the size of the data area 752 within a single page, a dummy data may be filled in the remaining part of the data area 752.

In the meta area 754, a memory system metadata 802 for each of the user data and the file system meta data may be recorded. The memory system metadata 802 may include a transaction ID information TxId and a data type information DataType. The data type information is information representing whether the data recorded in the data area 752 is a user data ("0: Data"), a file system metadata ("1: InodeChangeInfo" and "2: LBAValidInfo"), or a commit log ("3: Commit Start" and "4: Commit End").

The commit log may be a log recorded while a transaction is committed based on a transaction commit request from the host 102. Referring to FIG. 7, the commit log may include a commit start log ("3: Commit Start") and a commit end log ("4: Commit End"). The commit log will be described in detail later when a commit operation is described.

FIG. 7 illustrates a page Page 2 where an inode change is written due to the first transaction Tx1 and a page Page 3 where a block bitmap change is written due to the first transaction Tx1.

A write request may be generated as a transaction log request for the second transaction Tx2 so that the transaction ID Tx2 and the user data Data corresponding to the write request may be written into a page Page 4 of the memory block 750.

A write request may be generated as a transaction log request for the third transaction Tx3 so that the transaction ID Tx3 and the user data Data corresponding to the write request may be written into a page Page 5 of the memory block 750.

The inode may be changed as the write request of the third transaction Tx3 is serviced. FIG. 7 exemplarily illustrates a page Page 6 where the transaction ID Tx3 and the inode changed due to the third transaction Tx3 are written.

In response to the transaction commit request for the first transaction Tx1 provided from the operating system 716, the memory system 570 may reflect data stored in the pages Page 1 to Page 3, in the meta area 754 of which the transaction ID Tx1 is written, into the memory system 150. Herein, as for the block bitmap and the inode, only the inode and the LBA information changed due to the first transaction Tx1 and written in the pages Page 2 and Page 3 may be reflected into the memory system 150.

Therefore, since the multi-transaction memory system 110 in accordance with an embodiment of the present invention may secure the atomicity of the file system metadata (i.e., the block bitmap and the inode), the reliability of the memory system 110 may be improved.

FIG. 7 illustrates the memory device 150 which includes a memory block 750 and the controller 130 provided with a transaction log queue 732 and FTL metadata 734. The transaction log queue 732 and the FTL metadata 734 may be stored in the memory 144 of the controller 130. The memory block 750 may be any of the memory blocks 152 to 156 of FIG. 1.

The transaction log queue 732 may be a request queue for queuing a transaction log request corresponding to a transaction assigned in response to a transaction start request.

FIG. 7 shows that three transactions Tx1 to Tx3 are performed simultaneously in a transaction log queue 732, and the transaction log requests respectively corresponding to the transactions Tx1 to Tx3 are queued in the form of a linked list. The transactions Tx1 to Tx3 may be referred to as first to third transactions respectively.

According to an embodiment of the present invention, the FTL metadata 734 may include map data representing a relationship between each of logical block addresses used by the file system and a physical block address of a memory device 150 and a valid block bitmap.

The valid block bitmap may be a bitmap corresponding to a block bitmap BB stored in the memory 714 of the host 102. According to the prior art, the block bitmap BB may be managed by the file system as file system metadata. However, according to an embodiment of the present invention, the memory system 110 may manage the valid block bitmap along with the map data. The memory system 110 may provide the operating system with the block bitmap BB in response to the request from the host 102. The host 102 may not manage the valid block bitmap. Therefore, the processing burden on the host 102 may be alleviated.

Although FIG. 7 illustrates that the valid block bitmap is included in the FTL metadata 734, the present invention is not limited thereto. The valid block bitmap may be stored in another memory in the memory system 110.

When the memory system 110 provides the file system of the operating system 716 with the valid block bitmap in response to a valid block bitmap request, which is described below, of the operating system 716, the operating system 716 may generate a block bitmap BB by using the valid block bitmap and manage the file system.

The controller 130 may control the memory device 150 to write into the memory block 750 the transaction log data corresponding to the transaction log request queued in the transaction log queue 732. When the log page where the transaction log data is recorded is reflected into the memory system 110 according to a transaction commit request, the user data page and the inode page among the log pages may become data pages accessible by a request from the host 102. This will be explained in detail later.

Figure 9A:
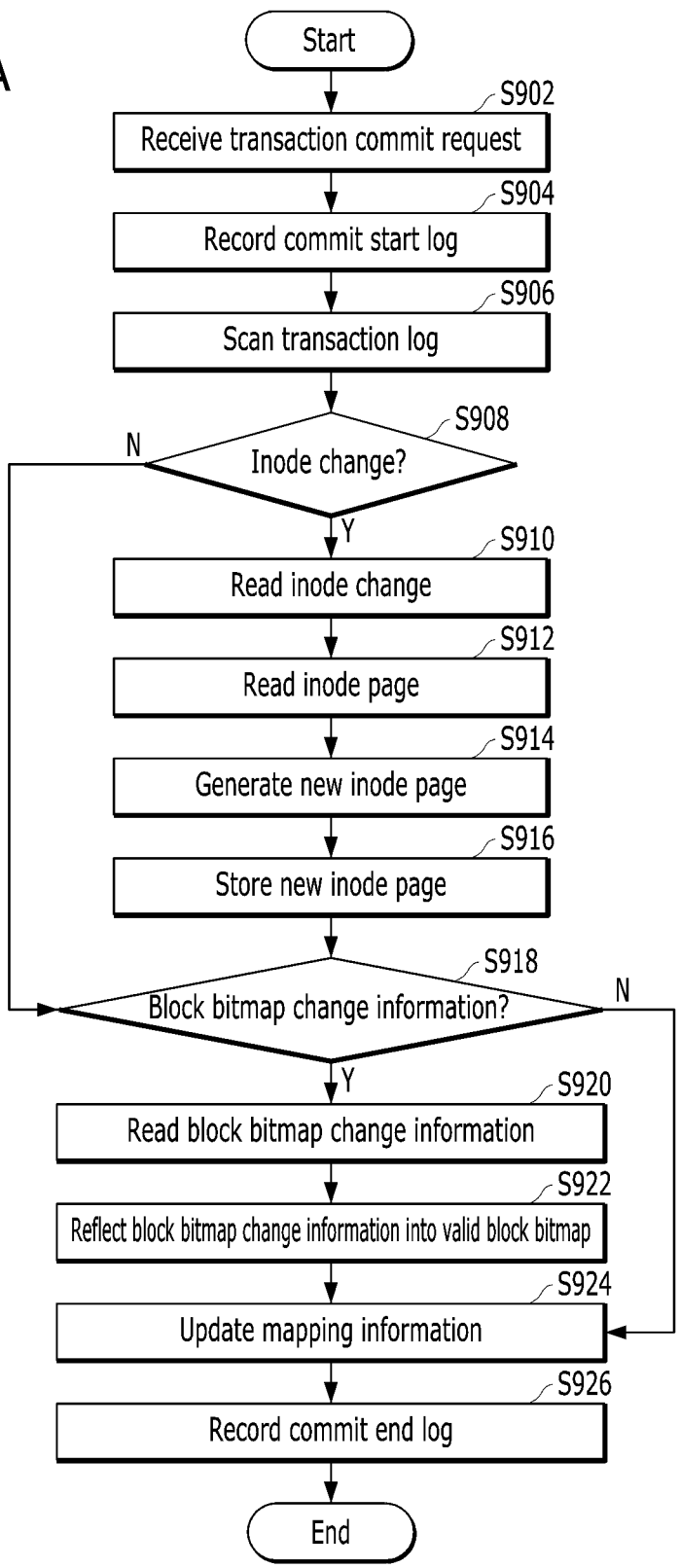
FIGS. 9A to 9C are diagrams illustrating a specific commit operation in accordance with an embodiment of the present invention.
Figure 9B:
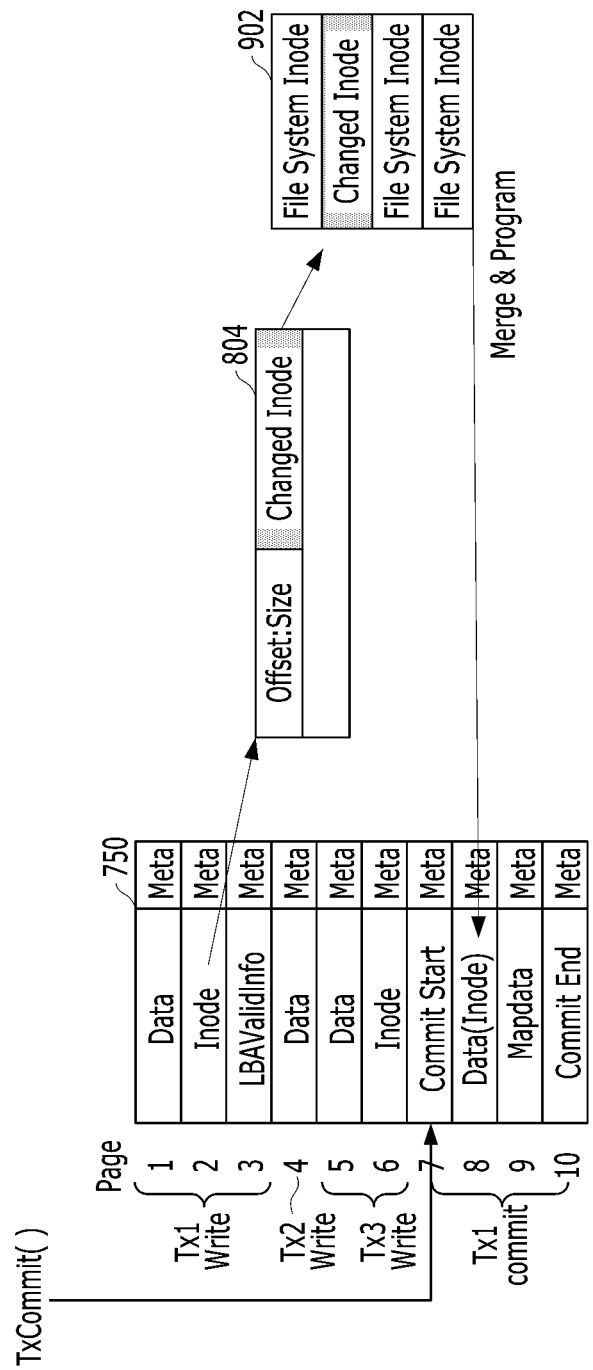
Figure 9C:
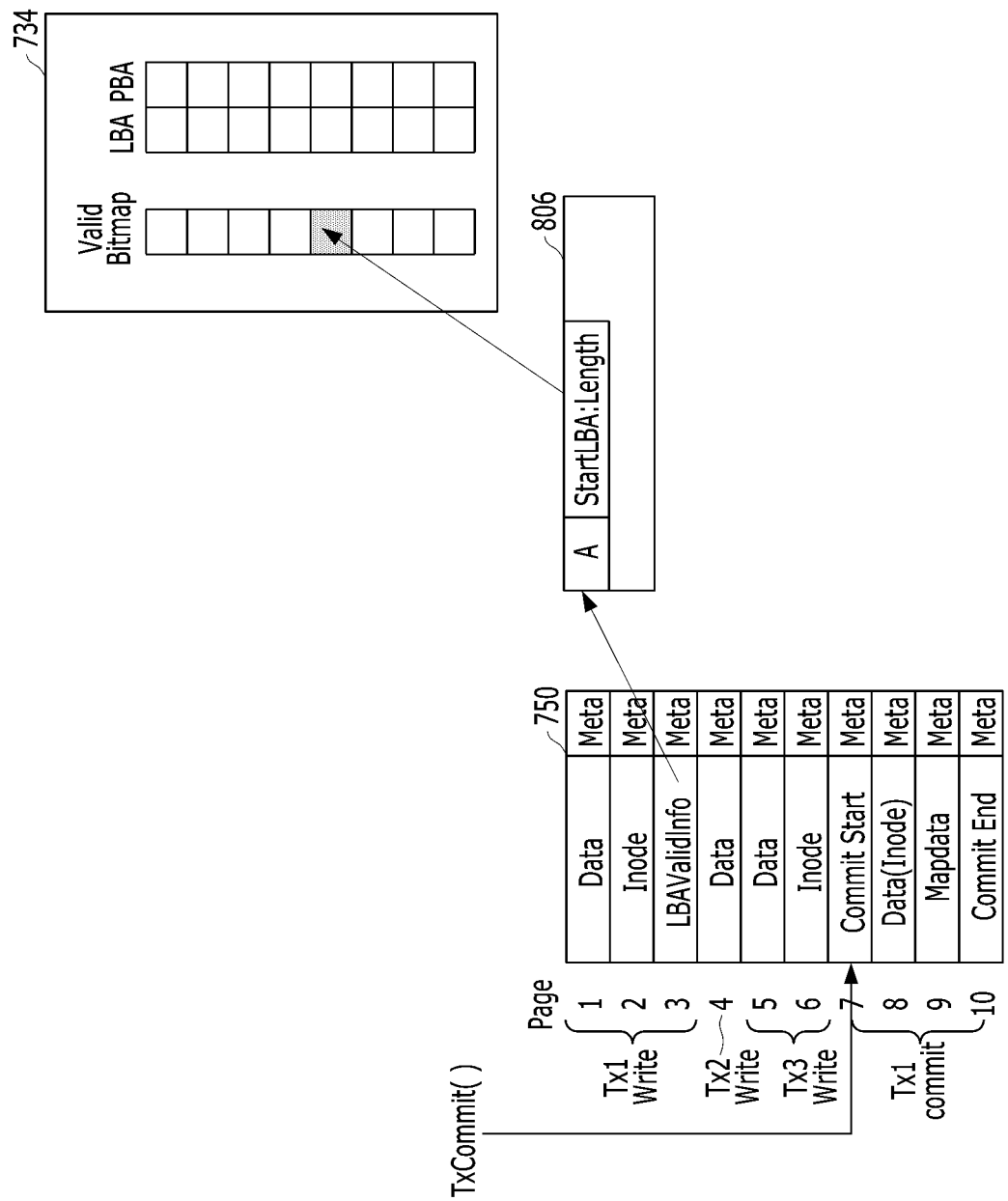

FIGS. 9A to 9C illustrate specific commit operations in accordance with an embodiment of the present invention.

FIG. 9A is a flowchart illustrating a commit operation of the multi-transaction memory system 110 in accordance with an embodiment of the present invention.

FIG. 9B is a diagram illustrating a method for reflecting an inode change in accordance with an embodiment of the present invention.

FIG. 9C is a diagram illustrating a method of reflecting a block bitmap change in accordance with an embodiment of the present invention.

In step S902, the controller 130 may receive a transaction commit request. FIGS. 9B and 9C illustrate that a commit request for the first transaction Tx1 is received.

In step S904, the controller 130 may control the memory device 150 to write a commit start log for the first transaction Tx1 into the memory block 750. FIGS. 9B and 9C illustrate a state where a commit start log for the first transaction Tx1 is recorded in the page Page 7 of the memory block 750. The ID of a transaction to be committed (e.g., the first transaction Tx1) may be recorded in the meta area 750 of the page where the commit start log is recorded.

In step S906, the controller 130 may scan the meta area 750 of the pages within the memory block 750 to detect pages corresponding to the first transaction Tx1 to be committed. Referring to FIGS. 9B and 9C, the controller 130 may detect the log pages Page 1 to Page 3 for the first transaction Tx1.

In step S908, the controller 130 may check whether there is a page where the inode change information 804 is recorded among the scanned pages. In the example of FIG. 9B, the inode change information InodeChangeInfo may be recorded in the page Page 2 according to the transaction log request for the first transaction Tx1.

When it turns out that there is no inode change information ('N' at step S908), the controller 130 may perform an operation of step S918.

When it turns out that there is the inode change information 804 ('Y' at step S908), the controller 130 may control the memory device 150 to read the inode change information 804 in step S910.

In step S912, the controller 130 may control the memory device 150 to read the existing inode page. According to the prior art, the inode table may include a plurality of inode pages. The existing inode page may represent inode page which is recently transaction committed among the inode pages. Referring to FIG. 9B, the inode data in an inode page is shown as 'Data(Inode)'.

In step S914, the controller 130 may generate inode data Data(Inode) for a new inode page 902 by merging the changed inode of the inode change information 804 with inodes of the existing inode page. Referring to FIG. 9B, the controller 130 may generate inode data Data(Inode) for a new inode page 902 by referring to the offset information and the size information of the changed inode included in the inode change information 804, and merging the changed inode, i.e., file system inode, with the inodes, i.e., file system inodes of the existing inode page.

In step S916, the controller 130 may control the memory device 150 to write the generated inode data Data(Inode) for a new inode page 902 into the memory block 750. FIG. 9B illustrates the generated inode data Data(Inode) stored in a page Page 8 as the new inode page 902 of the memory block 750.

In step S918, the controller 130 may check whether there is a page where the block bitmap change information 806 is recorded or not among the pages corresponding to the currently being committed first transaction Tx1 within the memory block 750.

When it turns out in the step S918 that the block bitmap change information 806 does not exist ('N' at step S918), the controller 130 may perform an operation of step S924.

When it turns out in the step S918 that there is a block bitmap change information 806 ('Y' at step S918), the controller 130 may read the block bitmap change information 806 in step S920. In the example of FIG. 9C, the block bitmap change information LBAValidInfo may be stored in the page Page 3 of the memory block 750.

In step S922, the controller 130 may reflect the block bitmap change information 806 into the valid block bitmap of the FTL metadata 734.

To be specific, the controller 130 may change the valid block bitmap of the FTL metadata 734 by referring to the LBA allocation information, the LBA start address StartLBA, and the size information Length included in the block bitmap change information 806. In the example of FIG. 9C, since the LBA allocation information is 'A', the controller 130 may change, for example, a bit value from '0' to '1' for the LBA corresponding to the LBA start address StartLBA and the size information Length in the valid block bitmap.

In step S924, the controller 130 may store into the memory block 750 (e.g., into a page Page 9) mapping information Mapdata of the user data Data of the page Page 1 and the inode data Data(Inode) for the new inode page 902 (i.e., the page Page 8). When the first transaction Tx1 is completed, the host 102 may access the user data Data and the inode Data(Inode) within the pages Page 1 and Page 8 by referring to the mapping information Mapdata of the page Page 9. In short, the log pages may become data pages that the host 102 may access.

In step S926, the controller 130 may record a commit end log including the transaction ID and end the operation. FIGS. 9B and 9C illustrate that a commit end log is recorded in a page Page 10. A transaction ID Tx1 may be recorded in the meta area of the page Page 10.

Referring back to FIG. 7, in response to a commit request for the first transaction Tx1, the controller 130 may write into the page Page 9 the mapping information Mapdata of the page Page 1 where the user data Data is written according to the transaction log request and the page Page 8 or the new inode page 902 where the new inode data Data(Inode) is stored according to the inode change information 804. As a result, the pages Page 1 and Page 8 may be accessible by the host 102. Portion 756 in FIG. 7, shown in dashed lines, represents pages accessible by the host 102 among the pages of memory block 750.

When the first transaction Tx1 is commit-completed, the inode change information InodeChangeInfo of the page Page 2 and the block bitmap change information LBAValidInfo of the page Page 3, which are written based on the transaction log request of the first transaction, and the commit start log Commit Start of the page Page 7 and the commit end log Commit End of the page Page 10, which are written based on the transaction commit request, may be invalidated and deleted through a garbage collection operation. The mapping information Mapdata of the page Page 9 may not be accessed by the host 102, but may remain in the memory block 750 as map data for the user data Data and the inode data Data(Inode).

Figure 10:
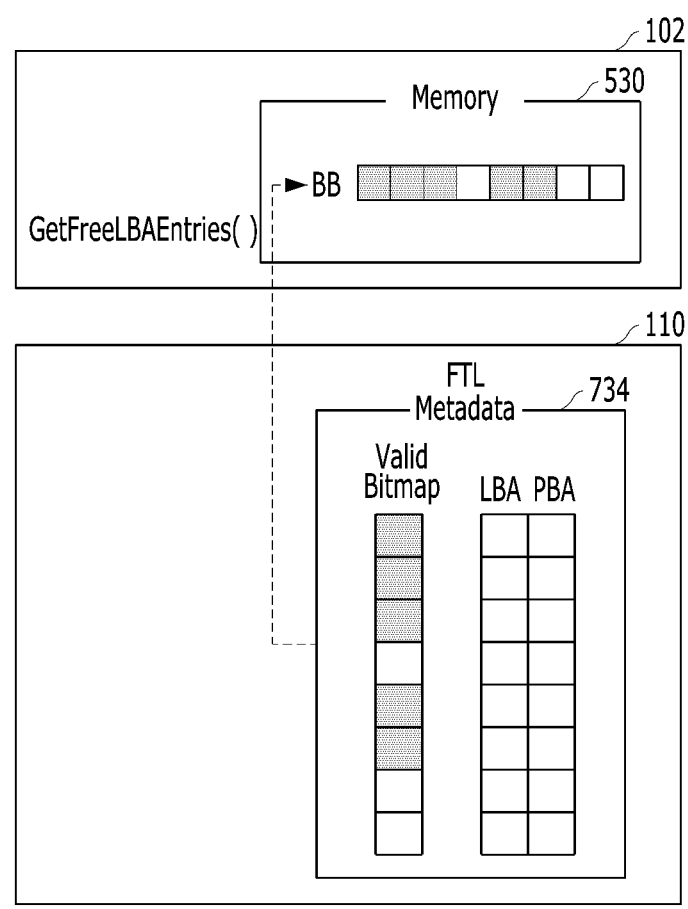
FIG. 10 is a block diagram illustrating a method for building a block bitmap of a file system by using a valid block bitmap in accordance with an embodiment of the present invention.

FIG. 10 is a block diagram illustrating a method for building the block bitmap BB by using the valid block bitmap in accordance with an embodiment of the present invention.

When the operating system 716 requires a block bitmap BB, the operating system 716 may provide the memory system 110 with a valid block bitmap request GetFreeLBAEntries.

The memory system 110 may provide the operating system 716 with the valid block bitmap, which is described with reference to FIGS. 9A and 9C, from the FTL metadata 734 in response to the request.

Although not illustrated, when the operating system 716 requires an inode, the operating system 716 may acquire the inode by providing the memory system 110 with a read request and loading the inode data Data(Inode), which is described with reference to FIGS. 9A and 9B, into the memory 714.

The database system including the host 102 and the multi-transaction memory system 110 may be interrupted. In this case, too, the multi-transaction memory system 110 may perform a recovery operation in order to secure the atomicity of the database system.

Figure 11:
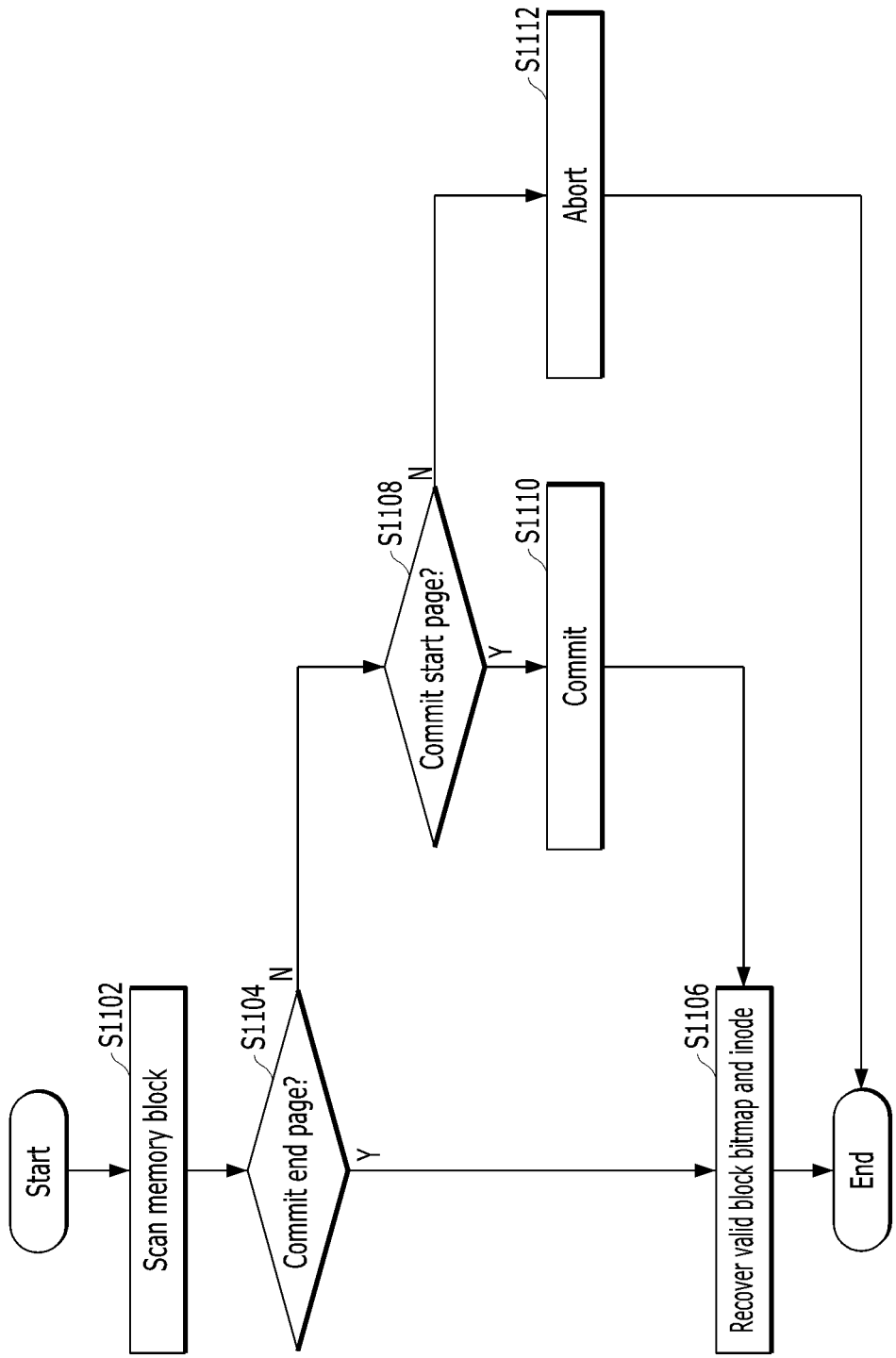
FIG. 11 is a flowchart illustrating a recovery operation of a multi-transaction memory system in accordance with an embodiment of the present invention.

FIG. 11 is a flowchart illustrating a recovery operation of the multi-transaction memory system 110 in accordance with an embodiment of the present invention.

When the memory system 110 is booted up, memory blocks therein may be scanned in step S1102. The memory blocks may be coupled to each other in the form of a linked list in the order in which they were written. The controller 130 may first scan open memory blocks and then scan the memory blocks in the reverse order of the write sequence through the linked list.

In step S1104, when the controller 130 detects the commit end log in a memory block ('Y' in step S1104), a transaction corresponding to the commit end log is already commit-completed.

However, even though the transaction is commit-completed, if the database system is interrupted, the valid block bitmap loaded in the volatile memory 144 of the controller 130 and the inode mapping information loaded in the volatile memory 714 of the host 102 may be lost due to the volatility. The controller 130 may recover the valid block bitmap and the inode table, which correspond to the commit-completed transaction, within the volatile memories 144 and 714 in step S1106.

In step S1106, the controller 130 may recover the valid block bitmap of the file system within the host 102 by providing the host 102 with the valid block bitmap from the FTL metadata 734 within the memory system 110.

If the controller 130 does not detect a commit end log ('N' in the step S1104) but detects a commit start log for the transaction ('Y' in the step S1108) in the memory block, a transaction corresponding to the detected commit start log is deemed committed but not completed. That is, all the transaction requests (i.e., the transaction start requests and the transaction log requests) for the uncompleted transaction corresponding to the detected commit start log are completely serviced and all the data corresponding to the transaction request are written in the memory block such as the memory block 750 shown in FIG. 7.

Therefore, the controller 130 in step S1110 may generate a new inode page 902 by updating the data in the existing inode page based on the changed inode of the inode change information 804. Also, the controller 130 may change the valid block bitmap of the FTL metadata 734 by referring to the LBA allocation information, the LBA start address StartLBA, and the size information Length included in the block bitmap change information 806. And, the controller 130 may write the mapping information Mapdata of the user data Data and the inode data Data(Inode) corresponding to the new inode page 902 into a memory block.

When the transaction is completed, the controller 130 may perform an operation of the step S1106 to recover the inode table of the file system.

In step S1106, the memory system 110 may recover the inode table of the file system by providing the host 102 with the logical block addresses of the inodes Data(Inode) in response to a request of the host 102. The logical block addresses of the inode data Data(Inode) may be provided from the mapping information Mapdata of the user data Data and the inode data Data(Inode) for the new inode page.

When the controller 130 detects a page in which a transaction ID is recorded, but does not detect a commit end log ('N' at step S1104) and does not detect a commit start log corresponding to the transaction ID ('N' in the step S1108) either, a transaction corresponding to the transaction ID is aborted. To be specific, the controller 130 may invalidate the pages corresponding to the transaction in the memory block. The data recorded in the invalidated pages may not be accessed by the host 102 and will be deleted through a garbage collection operation later.

As a result of the recovery operation, the atomicity of the multi-transaction memory system 110 may be secured by recovering all the user data and the file system metadata for the committed transaction and aborting all the data for an uncommitted transaction.

When some of the file system metadata are changed in the host 102, the multi-transaction memory system 110 in accordance with an embodiment of the present invention may log only the changes into a memory block. Therefore, when there is a transaction commit request for a particular transaction, only the changes in the transaction may be reflected into the file system metadata. In this way, the atomicity of the transaction may be secured even for the file system metadata as well.

Also, as the memory system 110 logs changes according to a transaction request into a memory block and manages the block bitmap BB and the inode table, which are the file system metadata, the processing burden on the host 102 may be alleviated.

A data processing system and electronic devices to which the memory system 110 including the memory device 150 and the controller 130 described above are applied, in accordance with embodiments of the present invention, are described below in more detail with reference to FIGS. 12 to 20.

Figure 12:
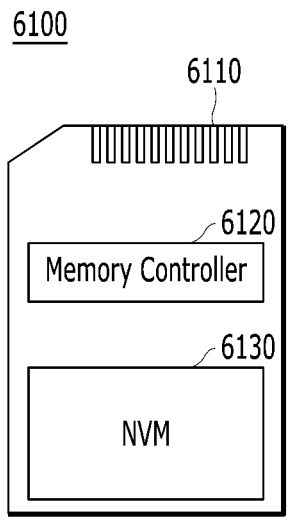
FIGS. 12 to 20 are diagrams schematically illustrating application examples of the data processing system, in accordance with various embodiments of the present invention.

FIG. 12 is a diagram schematically illustrating the data processing system including the memory system in accordance with an embodiment. FIG. 12 schematically illustrates a memory card system 6100 to which the memory system is applied.

Referring to FIG. 12, the memory card system 6100 may include a memory controller 6120, a memory device 6130 and a connector 6110.

More specifically, the memory controller 6120 may be connected to the memory device 6130 embodied by a nonvolatile memory (NVM), and configured to access the memory device 6130. For example, the memory controller 6120 may be configured to control read, write, erase and background operations of the memory device 6130. The memory controller 6120 may be configured to provide an interface between the memory device 6130 and a host (not shown), and drive firmware for controlling the memory device 6130. That is, the memory controller 6120 may correspond to the controller 130 of the memory system 110 described with reference to FIG. 1, and the memory device 6130 may correspond to the memory device 150 of the memory system 110 described with reference to FIG. 1.

Thus, as shown in FIG. 1, the memory controller 6120 may include a random access memory (RAM), a processor, a host interface, a memory interface and an error correction component.

The memory controller 6120 may communicate with an external device, for example the host 102 of FIG. 1, through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), wireless fidelity (Wi-Fi or WiFi) and Bluetooth. Thus, the memory system and the data processing system in accordance with an embodiment may be applied to wired and/or wireless electronic devices, particularly mobile electronic devices.

The memory device 6130 may be implemented by a nonvolatile memory. For example, the memory device 6130 may be implemented by any of various nonvolatile memory devices, such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM).

The memory controller 6120 and the memory device 6130 may be integrated into a single semiconductor device. For example, the memory controller 6120 and the memory device 6130 may be integrated to form a solid-state driver (SSD). Also, the memory controller 6120 and the memory device 6130 may form a memory card, such as a PC card (e.g., Personal Computer Memory Card International Association (PCMCIA)), a compact flash (CF) card, a smart media card (e.g., SM and SMC), a memory stick, a multimedia card (e.g., MMC, RS-MMC, MMCmicro and eMMC), an secured digital (SD) card (e.g., SD, miniSD, microSD and SDHC) and/or a universal flash storage (UFS).

Figure 13:
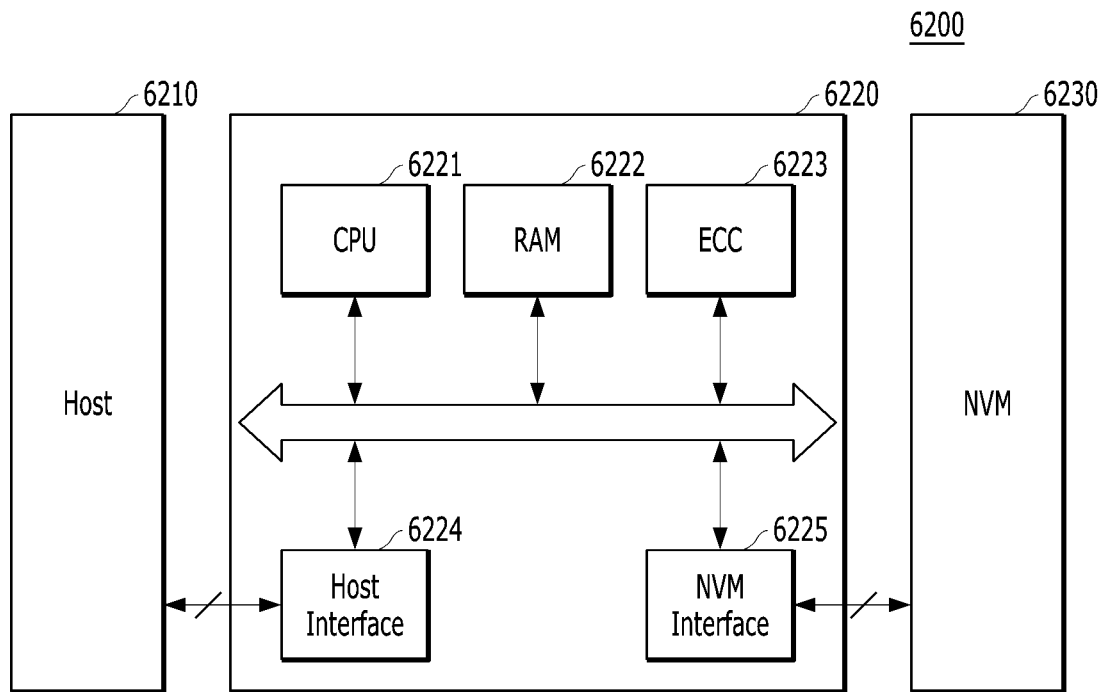

FIG. 13 is a diagram schematically illustrating another example of a data processing system 6200 including the memory system in accordance with an embodiment.

Referring to FIG. 13, the data processing system 6200 may include a memory device 6230 having one or more nonvolatile memories (NVMs) and a memory controller 6220 for controlling the memory device 6230. The data processing system 6200 may serve as a storage medium such as a memory card (CF, SD, micro-SD or the like) or USB device, as described with reference to FIG. 1. The memory device 6230 may correspond to the memory device 150 in the memory system 110 illustrated in FIG. 1, and the memory controller 6220 may correspond to the controller 130 in the memory system 110 illustrated in FIG. 1.

The memory controller 6220 may control a read, write or erase operation on the memory device 6230 in response to a request of the host 6210, and the memory controller 6220 may include one or more central processing units (CPUs) 6221, a buffer memory such as a random access memory (RAM) 6222, an error correction code (ECC) circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the memory device 6230 to operate at high speed.

The ECC circuit 6223 may correspond to the ECC component 138 of the controller 130 illustrated in FIG. 1. As described with reference to FIG. 1, the ECC circuit 6223 may generate an error correction code (ECC) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. For example, as described with reference to FIG. 1, the ECC circuit 6223 may correct an error using Low Density Parity Check (LDPC) code, Bose-Chaudhri-Hocquenghem (BCH) code, turbo code, Reed-Solomon code, convolution code, Recursive Systematic Code (RSC) or coded modulation such as Trellis-Coded Modulation (TCM) or Block coded modulation (BCM).

The memory controller 6220 may exchange data with the host 6210 through the host interface 6224, and exchange data with the memory device 6230 through the NVM interface 6225. The host interface 6224 may be connected to the host 6210 through a parallel advanced technology attachment (PATA) bus, serial advanced technology attachment (SATA) bus, small computer system interface (SCSI), universal serial bus (USB), peripheral component interconnect-express (PCIe) or NAND interface. The memory controller 6220 may have a wireless communication function with a mobile communication protocol such as wireless fidelity (WiFi) or Long Term Evolution (LTE). The memory controller 6220 may be connected to an external device, for example, the host 6210 or another external device, and then exchange data with the external device. In particular, as the memory controller 6220 is configured to communicate with the external device through one or more of various communication protocols, the memory system and the data processing system in accordance with an embodiment may be applied to wired and/or wireless electronic devices, particularly a mobile electronic device.

Figure 14:
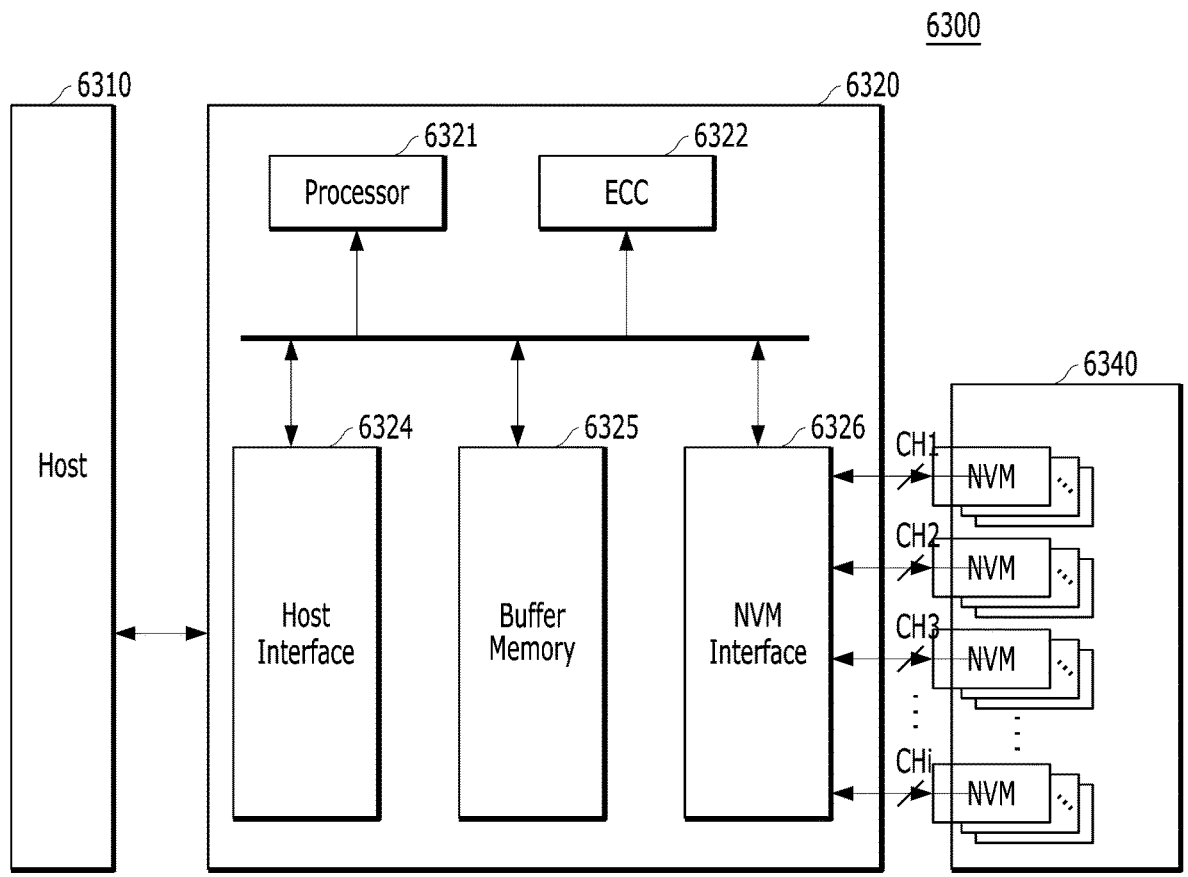

FIG. 14 is a diagram schematically illustrating another example of the data processing system including the memory system in accordance with an embodiment. FIG. 14 schematically illustrates a solid state drive (SSD) 6300 to which the memory system may be applied.

Referring to FIG. 14, the SSD 6300 may include a controller 6320 and a memory device 6340 including a plurality of nonvolatile memories (NVMs). The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, an error correction code (ECC) circuit 6322, a host interface 6324, a buffer memory 6325 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by any of various volatile memories, such as dynamic random access memory (DRAM), synchronous DRAM (SDRAM), double data rate (DDR) SDRAM, low power DDR (LPDDR) SDRAM and graphics RAM (GRAM) or nonvolatile memories such as ferroelectric RAM (FRAM), resistive RAM (RRAM or ReRAM), spin-transfer torque magnetic RAM (STT-MRAM) and phase-change RAM (PRAM). By way of example, FIG. 14 illustrates that the buffer memory 6325 is disposed in the controller 6320. However, the buffer memory 6325 may be external to the controller 6320.

The ECC circuit 6322 may calculate an error correction code (ECC) value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, a redundant array of independent disks (RAID) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 15:
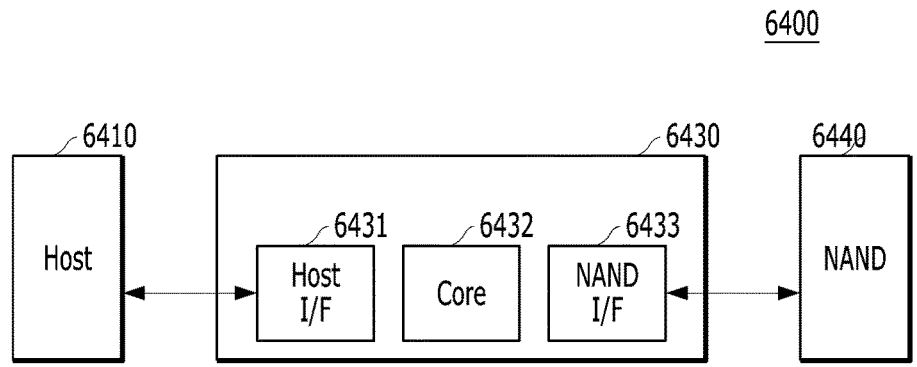

FIG. 15 is a diagram schematically illustrating another example of the data processing system including the memory system in accordance with an embodiment. FIG. 15 schematically illustrates an embedded Multi-Media Card (eMMC) 6400 to which the memory system may be applied.

Referring to FIG. 15, the eMMC 6400 may include a controller 6430 and a memory device 6440 embodied by one or more NAND flash memories. The controller 6430 may correspond to the controller 130 in the memory system 110 of FIG. 1, and the memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface (I/F) 6431 and a memory interface, for example, a NAND interface (I/F) 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, Ultra High Speed (UHS)-I and UHS-II interface.

FIGS. 16 to 19 are diagrams schematically illustrating other examples of the data processing system including the memory system in accordance with one or more embodiments. FIGS. 16 to 19 schematically illustrate universal flash storage (UFS) systems to which the memory system may be applied.

Referring to FIGS. 16 to 19, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired and/or wireless electronic devices, particularly mobile electronic devices, the UFS devices 6520, 6620, 6720 and 6820 may serve as embedded UFS devices. The UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired and/or wireless electronic devices, particularly mobile electronic devices, through UFS protocols. The UFS devices 6520, 6620, 6720 and 6820 and the UFS cards 6530, 6630, 6730 and 6830 may be embodied by the memory system 110 illustrated in FIG. 1. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 13 to 15, and the UFS cards 6530, 6630, 6730 and 6830 may be embodied in the form of the memory card system 6100 described with reference to FIG. 12.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, universal storage bus (USB) Flash Drives (UFDs), multi-media card (MMC), secure digital (SD), mini-SD, and micro-SD.

Figure 16:
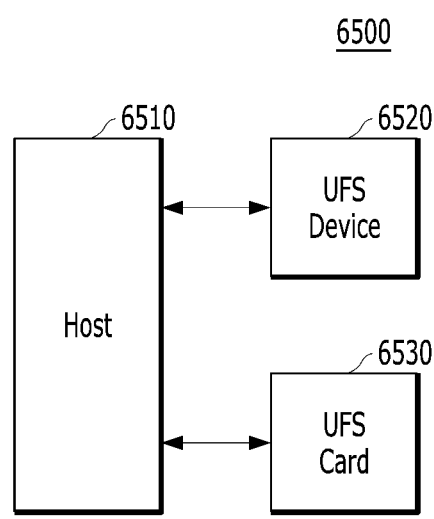

In the UFS system 6500 illustrated in FIG. 16, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In FIG. 16, according to an embodiment, the configuration in which one UFS device 6520 and one UFS card 6530 are connected to the host 6510 is illustrated. However, in another embodiment, a plurality of UFS devices and UFS cards may be connected in parallel or in the form of a star to the host 6510, and a plurality of UFS cards may be connected in parallel or in the form of a star to the UFS device 6520 or connected in series or in the form of a chain to the UFS device 6520.

Figure 17:
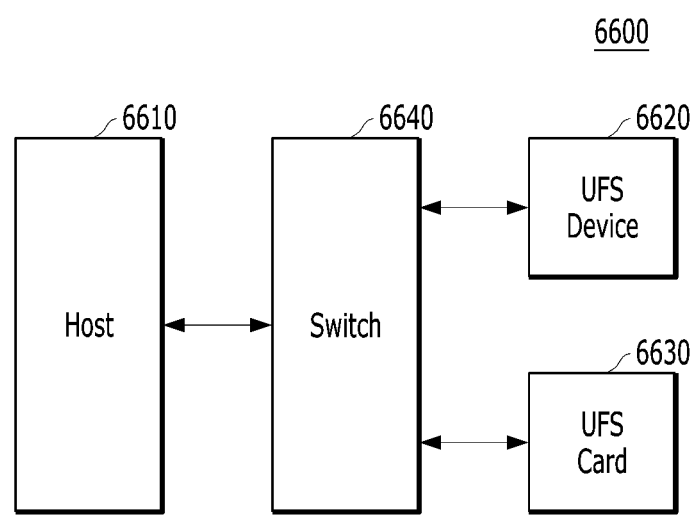

In the UFS system 6600 illustrated in FIG. 17, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In FIG. 17, according to an embodiment, the configuration in which one UFS device 6620 and one UFS card 6630 are connected to the switching module 6640 is illustrated. However, in another embodiment, a plurality of UFS devices and UFS cards may be connected in parallel or in the form of a star to the switching module 6640, and a plurality of UFS cards may be connected in series or in the form of a chain to the UFS device 6620.

Figure 18:
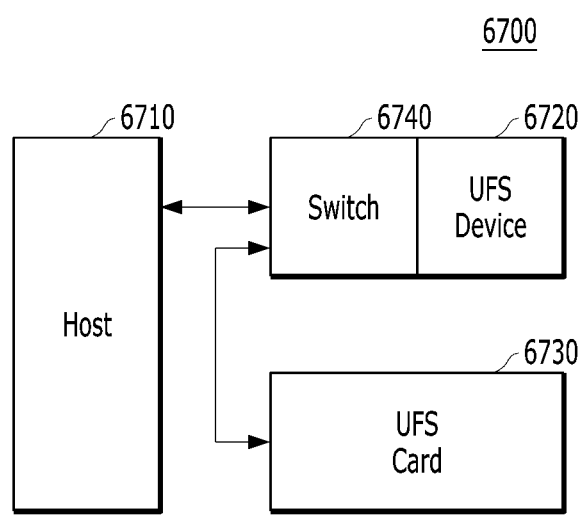

In the UFS system 6700 illustrated in FIG. 18, each of the host 6710, the UFS device 6720 and the UFS card 6730 may include UniPro. The host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro, and the switching module 6740 may be integrated as one module with the UFS device 6720 inside or outside the UFS device 6720. In FIG. 18, according to an embodiment, the configuration in which one UFS device 6720 and one UFS card 6730 are connected to the switching module 6740 is illustrated. However, in another embodiment, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 19:
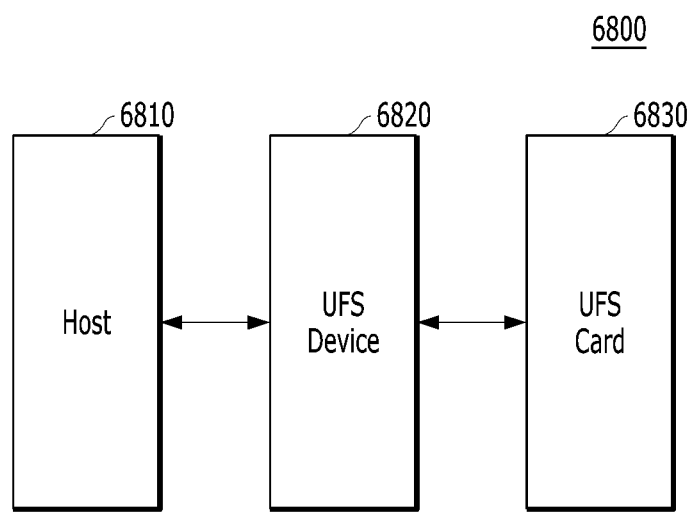

In the UFS system 6800 illustrated in FIG. 19, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target Identifier (ID) switching operation. The host 6810 and the UFS card 6830 may communicate with each other through target ID switching between the M-PHY and UniPro modules of the UFS device 6820. In FIG. 19, according to an embodiment, the configuration in which one UFS device 6820 is connected to the host 6810 and one UFS card 6830 is connected to the UFS device 6820 is illustrated. However, in another embodiment, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 20:
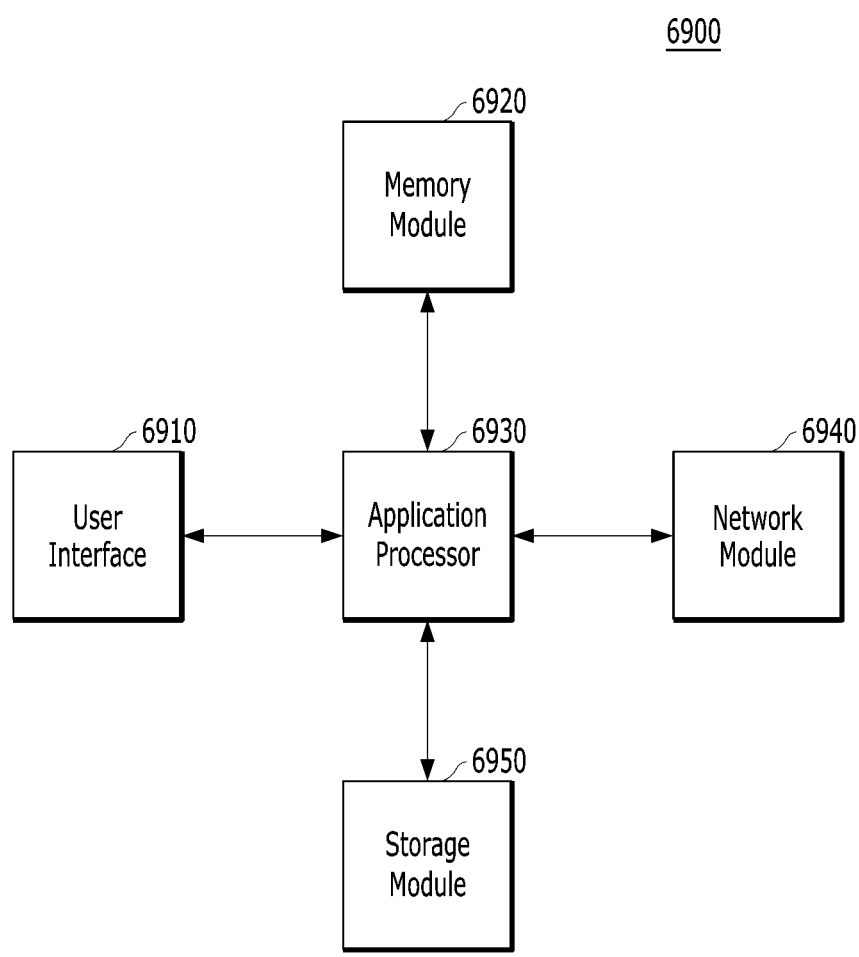

FIG. 20 is a diagram schematically illustrating another example of the data processing system including the memory system in accordance with an embodiment. FIG. 20 is a diagram schematically illustrating a user system 6900 to which the memory system may be applied.

Referring to FIG. 20, the user system 6900 may include a user interface 6910, a memory module 6920, an application processor 6930, a network module 6940, and a storage module 6950.

More specifically, the application processor 6930 may drive components included in the user system 6900, for example, an operating system (OS), and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile random access memory (RAM) such as a dynamic RAM (DRAM), a synchronous DRAM (SDRAM), a double data rate (DDR) SDRAM, DDR2 SDRAM, DDR3 SDRAM, LPDDR SDARM, LPDDR3 SDRAM or LPDDR3 SDRAM or a nonvolatile RAM such as a phase-change RAM (PRAM), a resistive RAM (ReRAM), a magneto-resistive RAM (MRAM) or a ferroelectric RAM (FRAM). For example, the application processor 6930 and the memory module 6920 may be packaged and mounted, based on Package on Package (PoP).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices, particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, eMMC and UFS as described above with reference to FIGS. 14 to 19.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control overall operations of the mobile electronic device, and the network module 6940 may serve as a communication module for controlling wired and/or wireless communication with an external device. The user interface 6910 may display data processed by the processor 6930 on a display/touch module of the mobile electronic device, or support a function of receiving data from the touch panel.

According to embodiments of the present invention, a multi-transaction memory system capable of securing the atomicity of file system metadata, and a method for operating the memory system are disclosed.

While the present invention has been illustrated and described with respect to the specific embodiments, it will be apparent to those skilled in the art in light of the present disclosure that various changes and modifications may be made without departing from the spirit and scope of the invention as defined in the following claims.

What is claimed is:
1. A multi-transaction memory system comprising:
 a memory block suitable for storing an i-node changed in response to a request from a host and a transaction identification (ID) of the request into one page of the memory block; and a controller suitable for;
receiving a transaction commit request including the transaction ID from the host;
controlling to write a commit start log for a first transaction into the memory block, wherein the transaction ID to be committed is recorded in a meta area of a page where the commit start log is recorded;
scanning the meta area of the page within the memory block to detect a page corresponding to the first transaction to be committed;
checking whether there is a page where an i-node change information is recorded among scanned pages;
reading an existing i-node page data;
generating a new i-node page data by updating the existing i-node page data with the changed i-node of the i-node change information;
storing the new i-node page data into the memory block; and
updating mapping information of the new i-node page data.

2. The multi-transaction memory system of claim 1, wherein the one page of the memory block further includes position information of the changed i-node in the existing i-node page data.

3. The multi-transaction memory system of claim 2, wherein the one page of the memory block further includes a dummy data based on a size of the changed i-node and a size of the position information.

4. The multi-transaction memory system of claim 1, wherein the existing i-node page data is an i-node page data stored in the memory block due to a commit-completed transaction before the transaction commit request.

5. The multi-transaction memory system of claim 1, wherein the controller further provides the host with the updated mapping information.

6. A method for operating a multi-transaction memory system, the method comprising:
receiving a transaction commit request including the transaction identification (ID) from a host;
writing a commit start log for a first transaction into a memory block, wherein the transaction ID to be committed is recorded in a meta area of a page where the commit start log is recorded;
scanning the meta area of the page within the memory block to detect a page corresponding to the first transaction to be committed;
checking whether there is a page where an i-node change information is recorded among scanned pages;
storing the i-node changed in response to a request from the host and the transaction ID of the request into one page of a memory block; and
performing a transaction commit in response to the transaction commit request from the host,
wherein the performing of the transaction commit includes:
reading an existing i-node page data;
generating a new i-node page data by updating the existing i-node page data with the changed i-node of the i-node change information;
storing the new i-node page data into the memory block; and
updating the mapping information of the new i-node page data.

7. The method of claim 6, wherein the one page of the memory block further includes position information of the changed i-node in the existing i-node page data.

8. The method of claim 7, wherein the one page of the memory block further includes a dummy data based on a size of the changed i-node and a size of the position information.

9. The method of claim 6, wherein the existing i-node page data is an i-node page data stored in the memory block due to a commit-completed transaction before the transaction commit request.

10. The method of claim 6, further comprising: providing the host with the updated mapping information.

11. A multi-transaction memory system comprising:
a host including an application layer and an operating system; and
a multi-transaction memory device,
wherein the operating system changes an i-node in response to a request from the application layer, and stores the changed i-node and a transaction ID of the request into one page of a memory block of the multi-transaction memory device, and
wherein the multi-transaction memory device receives a transaction commit request including the transaction ID from the host, controls to write a commit start log for a first transaction into a memory block, wherein the transaction ID to be committed is recorded in a meta area of a page where the commit start log is recorded,
wherein the multi-transaction memory device scans the meta area of the page within the memory block to detect a page corresponding to the first transaction to be committed, checks whether there is a page where an i-node change information is recorded among scanned pages, reads an existing i-node page data in response to the transaction commit request from the operating system, generates a new i-node page data by updating the existing i-node page data with the changed i-node, stores the new i-node page data into the memory block, and updates mapping information of the new i-node page data, and
wherein the operating system receives the updated mapping information from the multi-transaction memory device and builds an i-node table.

* * * * *